US012604234B2

(12) United States Patent
Chen et al.

(10) Patent No.: US 12,604,234 B2
(45) Date of Patent: Apr. 14, 2026

(54) WIRELESS COMMUNICATION METHOD, NETWORK ELEMENT, AND DEVICE

(71) Applicant: GUANGDONG OPPO MOBILE TELECOMMUNICATIONS CORP., LTD., Dongguan (CN)

(72) Inventors: Jingran Chen, Dongguan (CN); Yang Xu, Dongguan (CN); Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 330 days.

(21) Appl. No.: 18/218,816

(22) Filed: Jul. 6, 2023

(65) Prior Publication Data

US 2023/0354087 A1     Nov. 2, 2023

Related U.S. Application Data

(63) Continuation of application No. PCT/CN2021/070968, filed on Jan. 8, 2021.

(51) Int. Cl.
*H04W 28/02*     (2009.01)
*H04W 76/10*     (2018.01)

(52) U.S. Cl.
CPC ....... *H04W 28/0268* (2013.01); *H04W 76/10* (2018.02)

(58) Field of Classification Search
CPC .. H04W 28/0268; H04W 76/10; H04W 28/24
See application file for complete search history.

(56) References Cited

U.S. PATENT DOCUMENTS

2012/0209978 A1     8/2012   Cho et al.
2012/0263083 A1     10/2012  Zhou et al.
(Continued)

FOREIGN PATENT DOCUMENTS

CN     101227714 A     7/2008
CN     108323245 A     7/2018
(Continued)

OTHER PUBLICATIONS

Office Action issued by the European Patent Office for Application No. 21916850.7 mailed on Sep. 12, 2024.
(Continued)

*Primary Examiner* — Ayanah S George
(74) *Attorney, Agent, or Firm* — Sheppard, Mullin, Richter & Hampton LLP

(57)     ABSTRACT

Embodiments of the present disclosure provide a session management network element, a wireless communication method, and a policy control network element. The session management network element includes a processor and a memory. The memory has a computer program stored thereon, and the processor is configured to invoke and execute the computer program stored in the memory to perform a wireless communication method. The method includes: receiving a Quality of Service (QoS) parameter of a service flow of a first node in a first node group transmitted by a policy control network element, the QoS parameter of the service flow of the first node being determined based on a QoS parameter of the first node group; and determining a QoS parameter of a QoS flow of a first node in the first node group, based on the QoS parameter of the service flow of the first node.

17 Claims, 11 Drawing Sheets

(56)     References Cited

U.S. PATENT DOCUMENTS

| | | | | |
|---|---|---|---|---|
| 2015/0049610 A1* | 2/2015 | Kim | ................. | H04W 28/0215 370/233 |
| 2019/0191467 A1 | 6/2019 | Dao et al. | | |
| 2020/0178111 A1 | 6/2020 | Majmundar et al. | | |
| 2020/0396631 A1* | 12/2020 | Han | ................. | H04W 28/0268 |

FOREIGN PATENT DOCUMENTS

| | | |
|---|---|---|
| CN | 109392042 A | 2/2019 |
| CN | 110474969 A | 11/2019 |
| CN | 111480366 A | 7/2020 |
| CN | 112188239 A | 1/2021 |
| CN | 114760710 A | 7/2022 |
| WO | 2018076966 A1 | 5/2018 |

OTHER PUBLICATIONS

Office Action issued by the Chinese Patent Office for Application No. 202180079845.2 mailed on Oct. 8, 2024.

International Search Report and Written Opinion dated Oct. 9, 2021 in International Application No. PCT/CN2021/070968. English translation attached.

Huawei et al."S2-123648, Enforcing group level policy" SA WG2 Meeting #93, Oct. 12, 2012 (Oct. 12, 2012), p. 1.

Samsung."S2-1811592, 5G LAN Group Communication and Management" 3GPP TSG SA WG2 Meeting #129,Oct. 19, 2018 (Oct. 19, 2018), entire document.

"3rd Generation Partnership Project;Technical Specification Group Services and System Aspects;Study on traffic characteristics and performance requirements for AI/ML model transfer in 5GS (Release 18)" 3GPP TR 22.874 V0.2.0,Nov. 2020,Session 7.1.1.

Extended European Search Report dated Dec. 21, 2023 received in European Patent Application No. EP21916850.7.

Second Office Action issued by the Chinese Patent Office for Application No. CN202180079845.2 mailed on Jan. 23, 2025.

Communication pursuant to Article 94(3) EPC issued by the European Patent Office for Application No. EP21916850.7 mailed on Mar. 19, 2025.

Office Action issued by the European Patent Office for Application No. EP21916850.7 mailed on Oct. 1, 2025.

* cited by examiner

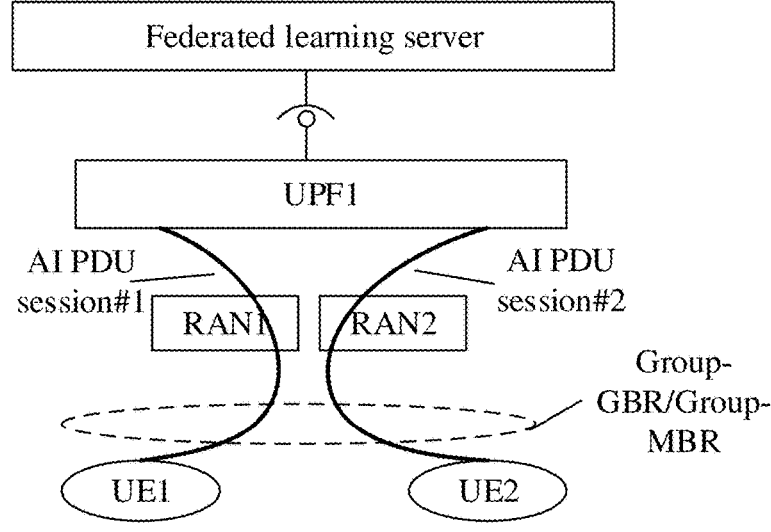
FIG. 7
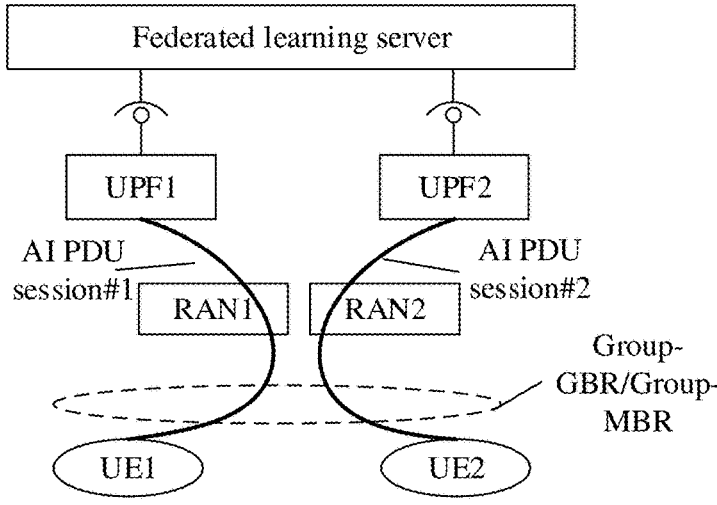
FIG. 8
410
Determining a QoS parameter of a QoS flow of a first node in a first node group, the QoS parameter of the QoS flow of the first node being determined based on a QoS parameter of the first node group
S411
FIG. 9

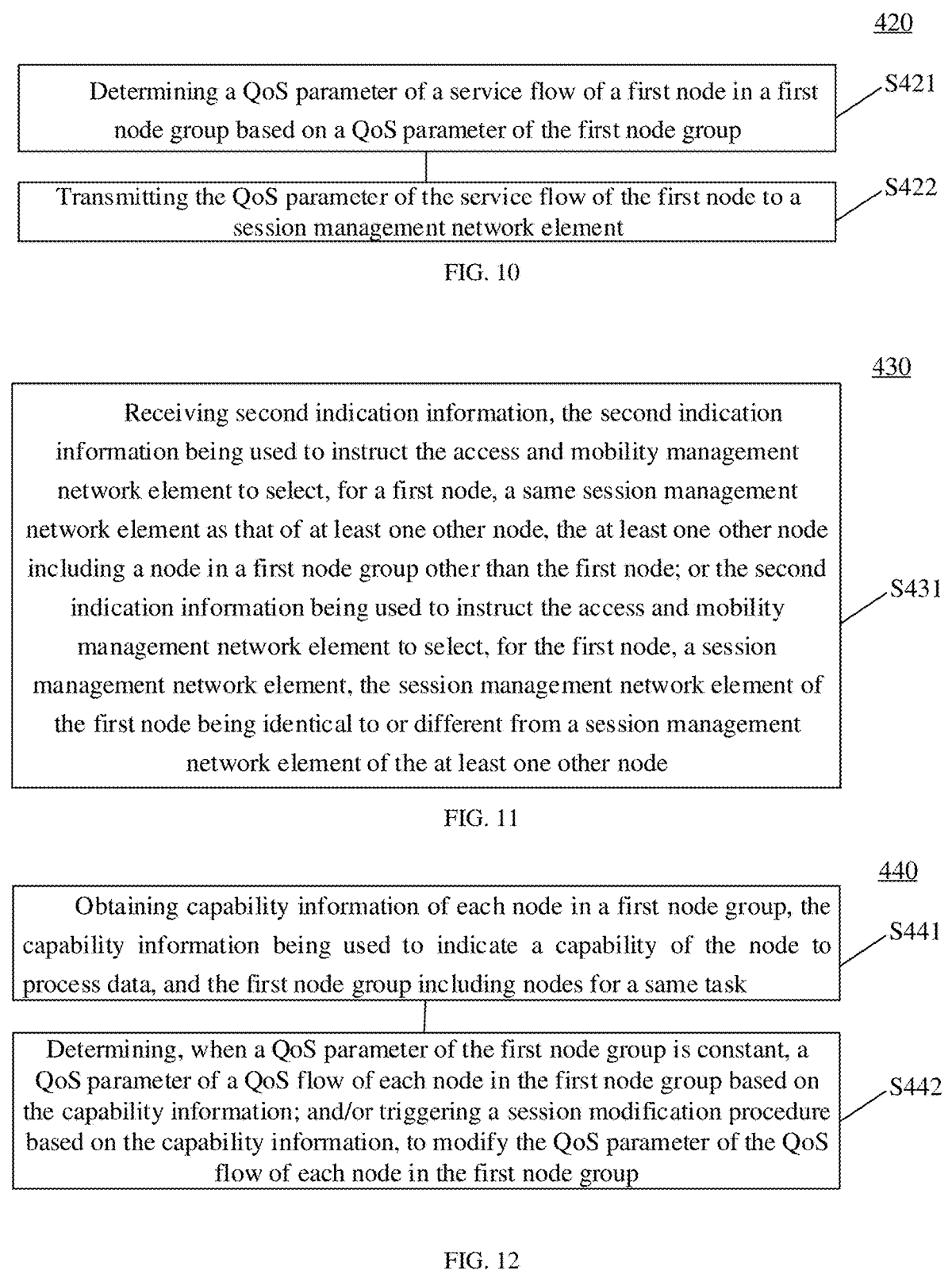

420

| Determining a QoS parameter of a service flow of a first node in a first node group based on a QoS parameter of the first node group | S421 |

| Transmitting the QoS parameter of the service flow of the first node to a session management network element | S422 |

| Receiving second indication information, the second indication information being used to instruct the access and mobility management network element to select, for a first node, a same session management network element as that of at least one other node, the at least one other node including a node in a first node group other than the first node; or the second indication information being used to instruct the access and mobility management network element to select, for the first node, a session management network element, the session management network element of the first node being identical to or different from a session management network element of the at least one other node | S431 |

| Obtaining capability information of each node in a first node group, the capability information being used to indicate a capability of the node to process data, and the first node group including nodes for a same task | S441 |

| Determining, when a QoS parameter of the first node group is constant, a QoS parameter of a QoS flow of each node in the first node group based on the capability information; and/or triggering a session modification procedure based on the capability information, to modify the QoS parameter of the QoS flow of each node in the first node group | S442 |

FIG. 12

WIRELESS COMMUNICATION METHOD, NETWORK ELEMENT, AND DEVICE

CROSS-REFERENCE TO RELATED APPLICATIONS

This application is a continuation of International Application No. PCT/CN2021/070968 filed on Jan. 8, 2021, the entire contents of which are incorporated herein by reference.

FIELD

Embodiments of the present disclosure relate to the field of communication, and more particularly, to a wireless communication method, a network element, and a device.

BACKGROUND

Until now, a Quality of Service (QoS) flow is specific to an individual User Equipment (UE). That is, a network device can allocate resources to each UE to guarantee its transmission quality. However, for a communication scenario of a group of nodes, the network device needs to guarantee an overall transmission quality of a number of nodes simultaneously, not just a transmission quality of a single node.

Therefore, it is an urgent technical problem to be solved in the field regarding how to guarantee the overall transmission quality of a number of nodes simultaneously.

SUMMARY

Embodiments of the present disclosure provide a session management network element, a wireless communication method, and a policy control network element.

In a first aspect, a session management network element is provided. The a session management network element includes a processor and a memory. The memory has a computer program stored thereon. The processor is configured to invoke and execute the computer program stored in the memory to perform a wireless communication method. The method includes: receiving a Quality of Service (QoS) parameter of a service flow of a first node in a first node group transmitted by a policy control network element, the QoS parameter of the service flow of the first node being determined based on a QoS parameter of the first node group; and determining a QoS parameter of a QoS flow of a first node in the first node group, based on the QoS parameter of the service flow of the first node.

In a second aspect, a wireless communication method is provided. The method is applicable in a policy control network element. The method includes: determining a QoS parameter of a service flow of a first node in a first node group based on a QoS parameter of the first node group; and transmitting the QoS parameter of the service flow of the first node to a session management network element.

In a third aspect, a policy control network element is provided. The policy control network element includes a processor and a memory. The memory stores a computer program. The processor is configured to invoke and execute the computer program stored in the memory to perform the method in any one of the above-mentioned second aspect.

BRIEF DESCRIPTION OF THE DRAWINGS

FIG. 5 to FIG. 8 each illustrate an example of an application scenario corresponding to a Group-Guaranteed Bit Rate (Group-GBR)/Group-Maximum Bit Rate (Group-MBR) according to an embodiment of the present disclosure.

FIG. 9 to FIG. 16 each are a schematic flowchart illustrating a wireless communication method according to an embodiment of the present disclosure.

DETAILED DESCRIPTION

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the scope of the present disclosure.

The embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

The embodiments of the present disclosure do not limit a spectrum to which they are applied. For example, the embodiments of the present disclosure may be applied to a licensed spectrum, or may also be applied to an unlicensed spectrum.

Figure 1:
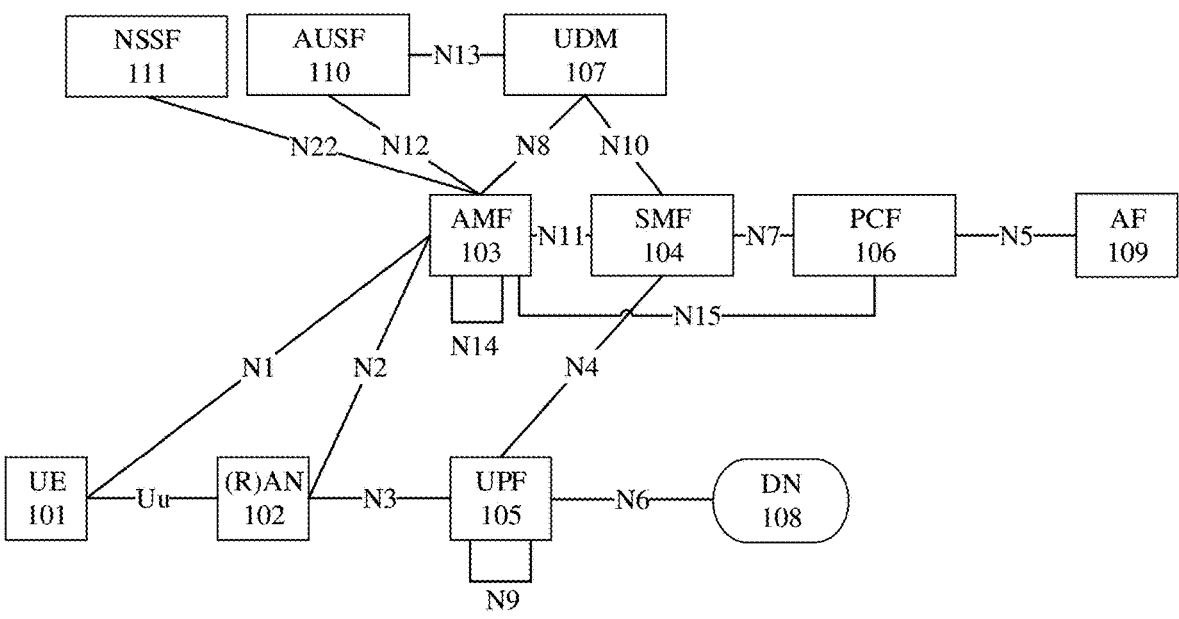
FIG. 1 and FIG. 2 each illustrate an example of a communication system according to an embodiment of the present disclosure.

FIG. 1 exemplarily illustrates a schematic diagram of a communication system 100 in which the present disclosure is applied. As illustrated in FIG. 1, the communication system 100 mainly includes a terminal device (or User Equipment, UE) 101, an Access Network (AN) device 102, an Access and Mobility Management Function (AMF) entity 103, a Session Management Function (SMF) entity 104, a User Plane Function (UPF) entity 105, a Policy Control Function (PCF) entity 106, a Unified Data Management (UDM) entity 107, a Data Network (DN) 108, an Application Function (AF) entity 109, an Authentication Server Function (AUSF) entity 110, and a Network Slice Selection Function (NSSF) entity 111.

In some embodiments, in the communication system 100, the UE 101 establishes an access stratum connection with the AN device 102 via an interface Uu, to perform an interaction of access stratum messages and wireless data transmission. The UE 101 establishes a Non-Access Stratum (NAS) connection with the AMF entity 103 via an interface N1, to perform an interaction of NAS messages. The AN device 102 is connected to the AMF entity 103 via an interface N2 and connected to the UPF entity 105 via an interface N3. A plurality of UPF entities 105 is connected to each other via an interface N9. The UPF entity 105 is connected to the DN 108 via an interface N6 and also connected to the SMF entity 104 via an interface N4. The SMF entity 104 is connected to the PCF entity 106 via an interface N7. The SMF entity 104 is connected to the UDM entity 107 via an interface N10. The SMF entity 104 controls the UPF entity 105 via an interface N4, and is connected to the AMF entity 103 via an interface N11. A plurality of AMF entities 103 is connected to each other via an interface N14. The AMF entity 103 is connected to the UDM entity 107 via an interface N8. The AMF entity 103 is connected to the AUSF entity 110 via an interface N12. The AMF entity 103 is connected to the NSSF entity 111 via an interface N22, and connected to the PCF entity 106 via an interface N15. The PCF entity 106 is connected to the AF entity 109 via an interface N5. The AUSF entity 110 is connected to the UDM entity 107 via an interface N13.

In the communication system 100, the UDM entity 107 is a subscription database in a core network, and stores subscription data in the a 5-th Generation Mobile Communication Technology (5G) network of a user. The AMF entity 103 is a mobility management function in the core network. The SMF entity 104 is a session management function in the core network. In addition to mobility management of the UE 101, the AMF entity 103 is also responsible for forwarding of session management-related messages between the UE 101 and the SMF entity 104. The PCF entity 106 is a policy management function in the core network, and is responsible for formulating policies related to mobility management, session management, billing, and the like for the UE 101. The UPF entity 105 is a user plane function in the core network, and is responsible for performing data transmission with an external data network via the interface N6 and performing data transmission with the AN device 102 via the interface N3. After the UE 101 accesses the 5G network via the interface Uu, a Protocol Data Unit (PDU) session data connection from the UE 101 to the UPF entity 105 is established under control of the SMF entity 104 to perform data transmission. The AMF entity 103 and the SMF entity 104 obtain subscription data of the user from the UDM entity 107 via the interface N8 and the interface N10, respectively, and obtain policy data from the PCF entity 106 via the interface N15 and the interface N7, respectively.

In addition, a Network Exposure Function (NEF) entity exits in the communication system 100. The NEF entity is configured to interface with a server of a third-party application to transfer information between nodes of the core network and the third-party application.

The UE 101 may also be referred to as a user device, an access terminal, a user unit, a user station, a mobile station, a mobile platform, a remote station, a remote terminal, a mobile device, a user terminal, a terminal, a wireless communication device, a user agent, a user apparatus, etc. The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld device having a wireless communication function, a computing device or other processing devices connected to a wireless modem, a vehicle-mounted device, a wearable device, and a next-generation communication system, e.g., a terminal device in an NR network or a terminal device in a future-evolved Public Land Mobile Network (PLMN) network. By way of example but not limitation, in the embodiments of the present disclosure, the terminal device may also be a wearable device. The wearable device can also be called a wearable smart device, which is a general term for devices that are wearable and developed by applying wearable technology to intelligently design daily wears, such as glasses, gloves, watches, clothing, shoes, etc. A wearable device is a portable device that is worn directly on the body or integrated into a user's clothing or accessory. The wearable device is not only a hardware device, but also realizes powerful functions through software support, data interaction, and cloud interaction. In a broad sense, wearable smart devices include a fully-functioned, large-size device that can achieve all or partial functions without relying on a smartphone, e.g., a smart watch or a pair of smart glasses, and a device that only focuses on a certain type of application function and needs to cooperate with other devices such as a smartphone, e.g., various types of smart bracelets and smart jewelry that monitor physical signs.

The AN device 102 may be a device configured to communicate with a mobile device, such as an Access Point (AP) in a WLAN, a Base Transceiver Station (BTS) in a GSM or a CDMA, a base station such as NodeB (NB) in a WCDMA, a base station such as Evolutional Node B (eNB or eNodeB) in an LTE, a relay station or an access point, a vehicle-mounted device, a wearable device, a base station such as the next generation Node B (gNB) in an NR network, a network device in a future evolved PLMN network, etc.

In the embodiments of the present disclosure, the AN device 102 provides services for a cell, and the UE 101 communicates with the AN device 102 through transmission resources (for example, frequency domain resources, or spectrum resources) used by the cell. The cell may be a cell corresponding to the AN device 102 (e.g., a base station), and the cell can belong to a macro base station, or belong to a base station corresponding to a small cell. Here, the small cell may include a metro cell, a micro cell, a pico cell, a femto cell, etc. These small cells have characteristics of small coverage and low transmit power, and are suitable for providing high-speed data transmission services.

It should be noted that, as an example, the communication system 100 described above is a 5G communication system.

Of course, the present disclosure may also be applicable to other 3-rd Generation Partnership Project (3GPP) communication systems, such as a 4-th Generation Mobile Communication Technology (4G) communication system, or a future 3GPP communication system. The present disclosure is not limited to any of these examples.

of the model, and also directly affects use of a memory of the processor. Optionally, with a decrease in a space of the memory of the processor, the value of the batch size becomes smaller. Required transmission latencies and required transmission rates vary for different batch sizes, and are described below in combination with Table 1.

TABLE 1

| Batch size | GPU computation time (ms) | Required latency | | Required data rate | |
| | | For trained gradient uploading (ms) | For global model distribution (ms) | For trained gradient uploading (Gbps) | For global model distribution (Gbps) |
| --- | --- | --- | --- | --- | --- |
| 64 | 325 | [<162 ms] | [<162 ms] | [6.5] | [6.5] |
| 32 | 191 | [<95 ms] | [<95 ms] | [11.1] | [11.1] |
| 16 | 131 | [<65 ms] | [<65 ms] | [16.2] | [16.2] |
| 8 | 111 | [<55 ms] | [<55 ms] | [19.2] | [19.2] |
| 4 | 105 | [<52 ms] | [<52 ms] | [20.3] | [20.3] |

It should be understood that a device having a communication function in the network/system in the embodiments of the present disclosure may be referred to as a communication device.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "I" in the present disclosure generally represents an "or" relationship between the correlated objects preceding and succeeding the symbol.

As performance of cameras and sensors on mobile devices continues to improve, more and more devices are capable of collecting valuable training data that is essential for Artificial Intelligence/Machine Learning (AI/ML) model training. For many AI/ML tasks, small sample data collected by the mobile terminal is important for training a global model.

Figure 2:
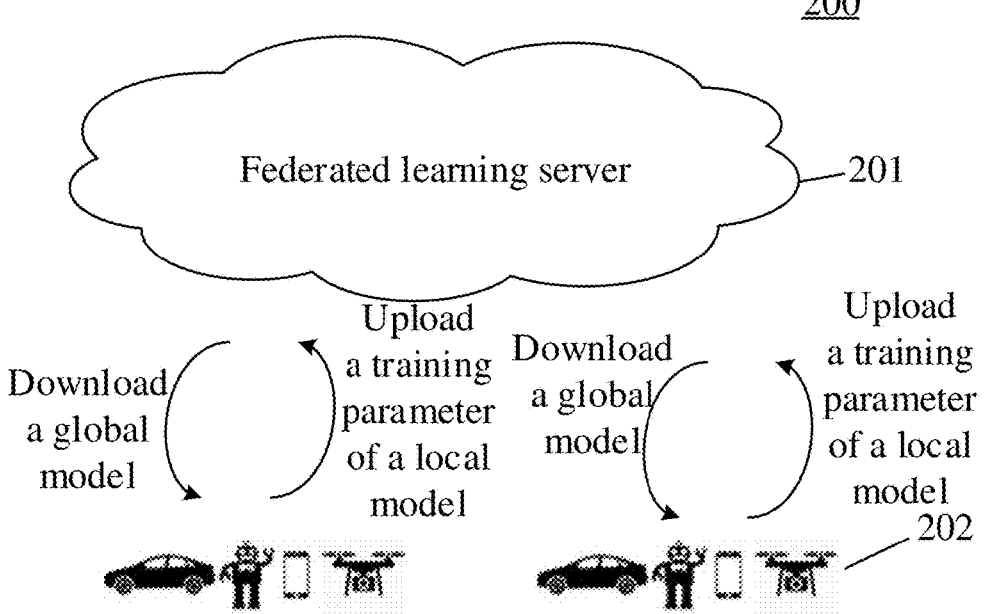

FIG. 2 illustrates an example of a communication system 200 according to an embodiment of the present disclosure. The communication system 200 may also be referred to as a federated learning architecture.

As illustrated in FIG. 2, a federated learning server 201 completes training of a global model by aggregating local training results reported by individual terminals 202. In each training iteration, the terminal 202 may perform training on the global model downloaded from the federated learning server 201 using local training data, and then report an intermediate training result (e.g., a gradient of a Deep Neural Network (DNN)) to the federated learning server 201 over a 5G uplink channel. The federated learning server 201 aggregates the collected gradients and updates the global model. The federated learning server 201 distributes the updated global model to the terminal 202 over a 5G downlink channel. The terminal 202 performs next iterative training for the updated global model.

Parameters used in iterative training by the federated learning server 201 or the terminal 202 include, but are not limited to, a batch size. The batch size is used to define a quantity of samples selected for one time of training, or is used to define a quantity of samples selected for each iteration processing of the training. A value of the batch size affects a degree of optimization and a speed of optimization As shown in Table 1, a greater batch size comes with longer processing time of the processor, a longer required latency, and a smaller required data rate. In some embodiments, during one iteration, a transmission rate at which the federated learning server 201 issues model data ranges from 6.5 Gbps to 20.3 Gbps, and similarly, a transmission rate at which a group of terminals 202 upload a training result to the federated learning server 201 ranges from 6.5 Gbps to 20.3 Gbps. High-quality communication is required between the group of terminals 202 and the network to ensure exchange of data, which guarantees diversity of data sets and generalization of models, rather than just a transmission quality of one or a few of the terminals 202 in the group of terminals 202.

The exchange of data may be ensured between the group of terminals 202 and the network by means of a network slice. That is, data is bound to a corresponding QoS flow for transmission. The network slice may be identified using Single-Network Slice Selection Assistance Information (S-NSSAI). A set of S-NSSAI becomes NSSAI. Referring to FIG. 1, the UE 101 needs to make a request to the AMF entity 103 to use a network slice when needing to use the slice, and then after the AMF entity 103 agrees to the request, the UE 101 requests to establish a PDU session in the slice to transmit data. The UE 101 places to-be-requested S-NSSAI in requested NSSAI based on a service. The requested NSSAI is transmitted to the AMF entity 103 through being included in a registration request. The AMF entity 103 determines allowed NSSAI based on subscription of the UE 101 and a deployment scope of the network slice. The allowed NSSAI is placed in a registration accept message to be transmitted to the UE 101 and placed in an N2 message to be transmitted to the AN device 102. After receiving the allowed NSSAI, the UE 101 needs to establish the PDU session in a slice corresponding to the service selected from slices of the allowed NSSAI. Data may only be transmitted and received after the PDU session is established.

It should be understood that, a scenario illustrated in FIG. 2 is only an example of an applicable scenario of the solution of the present disclosure and should not be construed as a limitation of the present disclosure. That is, the solution provided by the present disclosure is applicable in any application scenario where a communication quality of a group of nodes needs to be guaranteed simultaneously.

Figure 3:
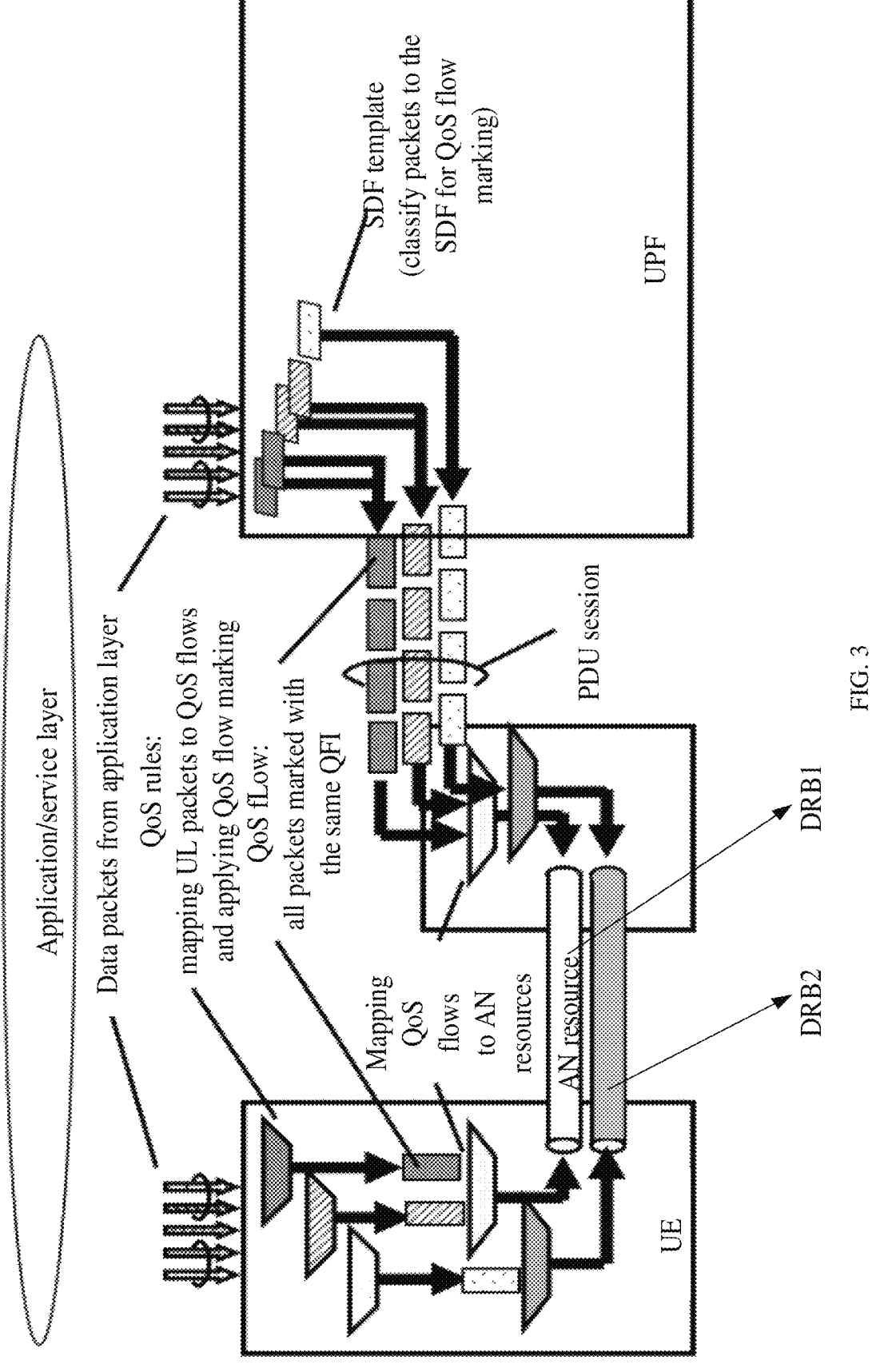
FIG. 3 is a schematic diagram illustrating end-to-end QoS control and a mapping relationship of a QoS flow on a user plane according to an embodiment of the present disclosure.

FIG. 3 is a schematic diagram of end-to-end OoS control and a mapping relationship of a QoS flow on a user plane according to an embodiment of the present disclosure.

As illustrated in FIG. 3, the PCF formulates a Policy Charging Control (PCC) rule based on information collected from individual network elements and its own configuration, and transmits the PCC rule to the SMF. The SMF provides, based on the PCC rule, the following three types of information to the UPF, the AN, and the UE, respectively to achieve end-to-end QoS control. The SMF provides a QoS policy (or QoS profile) to the AN. The QoS policy may include the following QoS parameters for this QoS flow: a 5G QoS Identifier (5QI), an Allocation and Retention Priority (ARP), a bit rate requirement, etc. The SMF provides one or more QoS rules to the UE to primarily detect uplink data. The SMF provides to the UPF one or more uplink and downlink Packet Detection Rules (PDRs) and corresponding QoS enforcement rules.

In a downlink direction, the UPF performs matching on a received data packet based on priorities of downlink packet filter sets in the PDRs transmitted by the SMF in a descending order. When a downlink PDR matching the data packet is found, a corresponding QoS Flow Identifier (QFI) is encapsulated in a header based on a matching result. A Radio Access Network (RAN) maps the data packet to a corresponding Data Radio Bearer (DRB) based on the QFI. When the data packet matches no downlink PDR, the UPF discards the data packet. In an uplink direction, the UE performs matching on a to-be-transmitted data packet based on priorities of uplink packet filter sets in the QoS rules in a descending order. When matching succeeds, the UE binds an uplink packet to the QoS flow using a QFI in a corresponding one of the QoS rules, and further binds the QoS flow to a corresponding Data Radio Bearer (DRB). When matching fails, the UE discards the data packet. However, a default QoS rule exists in the UE. A packet filter set by the default QoS rule may provide permissions to all data packets, aiming to match all data packets and avoiding a loss of an uplink data packet.

As an important measurement metric of communication quality, a QoS parameter is often used to represent a feature of QoS flows, which are primarily divided into Guaranteed Bit Rate (GBR) QoS flows and non-GBR QoS flows. For the GBR QoS flows, the network needs to reserve resources to guarantee a bandwidth.

The QoS parameter mainly includes a 5QI, an ARP, a Reflective QoS Attribute (RQA), a Guaranteed Flow Bit Rate (GFBR), a Maximum Flow Bit Rate (MFBR), notification control, an Aggregate Maximum Bit Rate (AMBR), etc. Each parameter will be explained below.

The 5QI can be understood as a scalar that points to a plurality of QoS feature values, and is categorized into three types: a standardized 5QI, a pre-configured 5QI, and a dynamically-allocated 5QI. For the dynamically-allocated 5QI, when the core network provides a QoS flow configuration of the QoS flow to the base station, the QoS flow configuration should not only include the 5QI, but also include a complete set of QoS feature values corresponding to the 5QI. For standardized and pre-configured 5QIs, the base station can resolve a set of a plurality of QoS feature values corresponding to the 5QI as long as the core network provides the 5QI. Or, for one standardized or pre-configured 5QI, the core network is also allowed to provide one or more QoS feature values that differ from the standardized or pre-configured 5QI, to modify a corresponding standardized or pre-configured 5QI feature value. The standardized 5QI is mainly used for generic, frequently-used services. The dynamically-allocated 5QI is mainly used for less generic services that fail to be satisfied by the standardized 5QI.

The ARP allocates and maintains priorities, which specifically includes three types of information: a priority level, a resource preemption capability, and whether to allow a resource to be preempted. The ARP is used to determine whether to allow the QoS flow to be established, modified, or switched when resources are constrained, and is generally used for admission control of a GBR-type QoS flow. Also, the ARP is used to preempt a resource of an existing QoS flow when resources are constrained. For example, a high-priority QoS flow may preempt a low-priority QoS flow.

The RQA instructs a QoS flow borne by a Service Data Flow (SDF) to apply a reflective mapping QoS.

The GFBR instructs the base station to ensure that sufficient resources are reserved for a bit rate of transmission of a QoS flow within an average time window. The MFBR is limited to a maximum bit rate of transmission of a QoS flow.

The notification control of the QoS instructs the base station to continue its efforts to maintain the QoS flow and notify the core network that a QoS demand fails to be guaranteed, when the base station is unable to guarantee the GFBR of the QoS flow. A Next Generation-Radio Access Network (NG-RAN) attempts to re-guarantee the GFBR of the QoS flow and notifies the SMF that the QoS demand is re-guaranteed.

The session-AMBR controls a total bit rate of all non-GBR-type QoS flows of one PDU session. The UE-AMBR controls a total bit rate of all non-GBR-type QoS flows of one UE.

Figure 4:
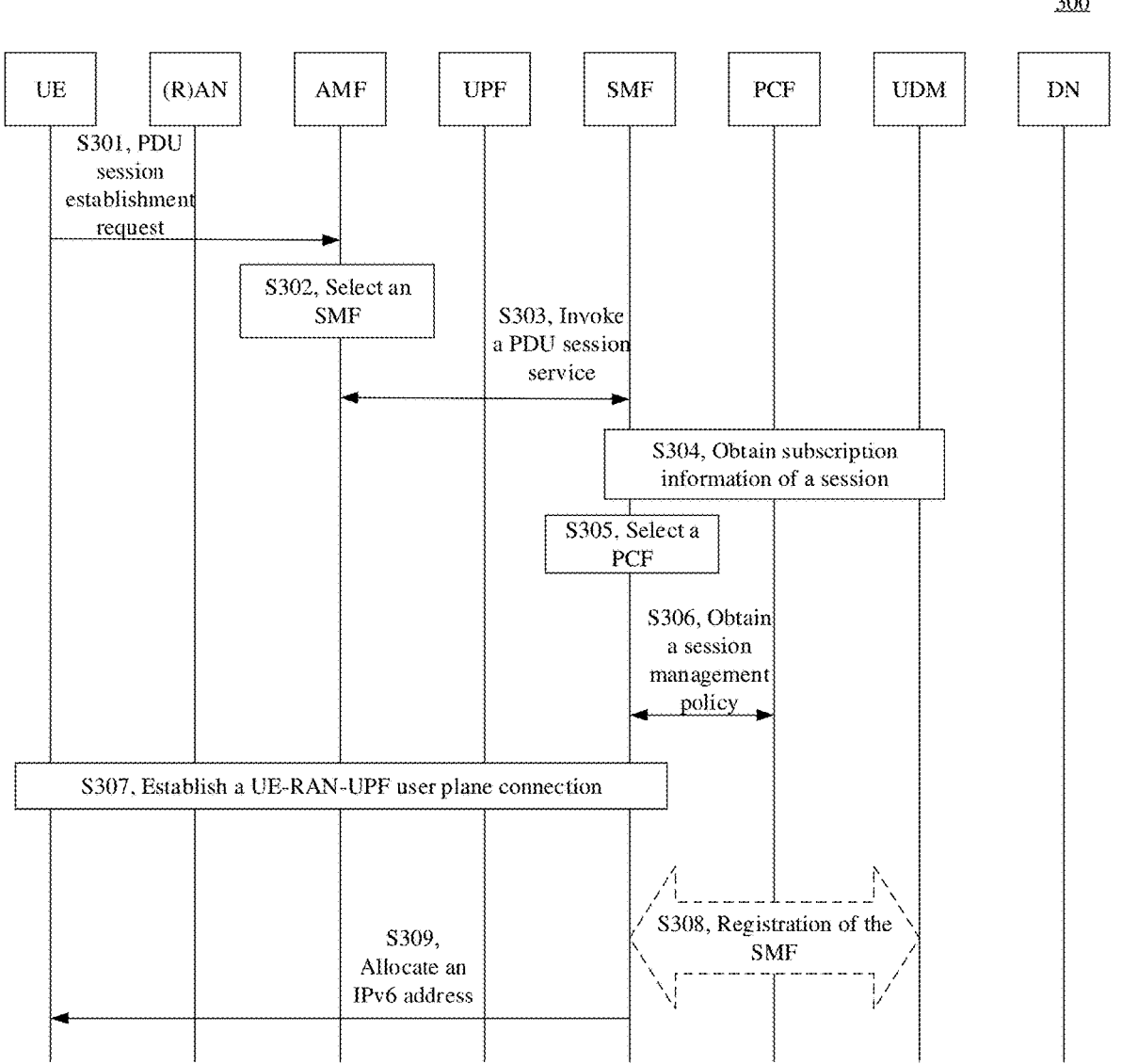
FIG. 4 is a schematic flowchart illustrating a session establishment procedure according to an embodiment of the present disclosure.

FIG. 4 is a schematic flowchart illustrating a session establishment procedure 300 according to an embodiment of the present disclosure.

As illustrated in FIG. 4, the session establishment procedure 300 may include the following operations.

At S301, the UE transmits a session establishment request message to the AMF. The session establishment request message contains parameters such as a session identifier, a session type (an initial session establishment, an Evolved Packet System (EPS) to 5GS handover, a Non-3GPP to 3GPP handover, and a request for an emergency service), a Secondary Component Carrier (SCC) mode, a DNN, and S-NSSAI.

At S302, the AMF selects an appropriate SMF based on the DNN, the S-NSSAI, and subscription data.

At S303, the AMF invokes a session service of the selected SMF to trigger session establishment.

At S304, the SMF obtains from the UDM subscription data of a session, such as an SCC mode allowed by the user, a session type, and a Session-AMBR of the session.

At S305, the SMF selects a PCF for the session.

At S306, the SMF establishes a policy connection with the PCF and obtains a PCC rule.

At S307, the SMF establishes a user plane connection between the UE, the AN, and the UPF, which mainly involves CN tunnel info allocation and AN tunnel info obtaining. The SMF transmits a session establishment acceptance message to the UE via the AMF and the AN.

At S308, the SMF registers with the UDM, and the UDM records an SMF ID corresponding to the session.

At S309, the SMF assigns an IPv6 prefix to the UE. The IPv6 prefix is transmitted to the UE via a user plane.

The session establishment procedure 300 illustrated in FIG. 4 reveals that the QoS flow is specific to a single UE. That is, the network may allocate a resource to each UE to guarantee its transmission quality. However, when encountering a scenario of the federated learning described above, the network needs to guarantee an overall transmission quality of a group of nodes, not just a quality of a single node. Parameters involved in the session establishment procedure 300 can neither instruct the network to guarantee a quality of service of the group of nodes, nor implement, based on differences in both communication qualities and computing power between different nodes in the group, flexible cross-UE resource scheduling to ensure that the group of nodes completes a training iteration efficiently.

Transmitting a parameter of an AI model by the UE requires a very high transmission rate. Therefore, for the network to guarantee the quality of service for the group of nodes, and also to implement, based on the differences in both communication qualities and computing power between different nodes in the group, the flexible cross-UE resource scheduling to ensure that the group of nodes complete the training iteration efficiently, the present disclosure introduces a new parameter, i.e., a Group-GBR/Group-MBR. The Group-GBR represents a transmission rate guaranteed by the network for a group of nodes performing a same task, i.e., a sum of GBRs of all QoS flows of all nodes in the group performing the same task. The Group-MBR represents a maximum transmission rate limited by the network for a group of nodes performing a same task, i.e., a sum of GBRs of all QoS flows of all nodes in the group performing the same task and/or a sum of non-GBRs of all QoS flows of all nodes in the group performing the same task.

FIG. 5 to FIG. 8 each illustrate an example of an application scenario corresponding to a Group-GBR/Group-MBR according to an embodiment of the present disclosure.

Application scenarios of the Group-GBR/Group-MBR according to the embodiments of the present disclosure are illustrated below in conjunction with FIG. 5 to FIG. 8.

Figure 5:
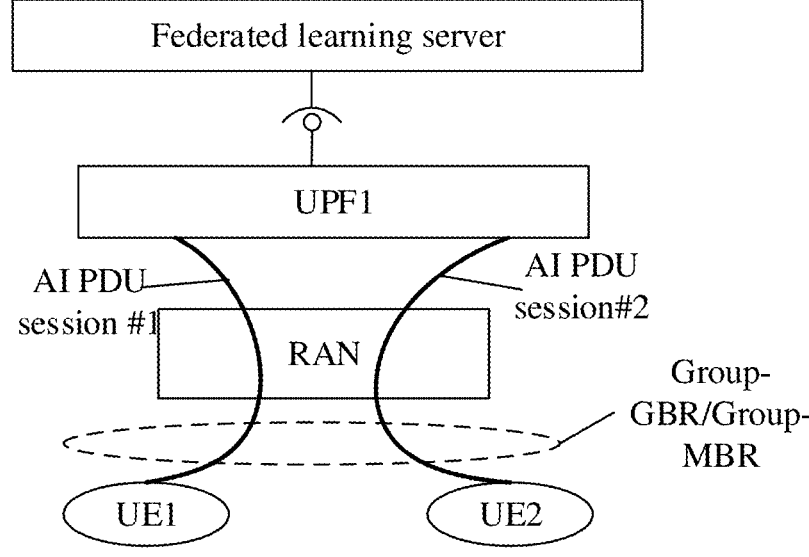
Figure 6:
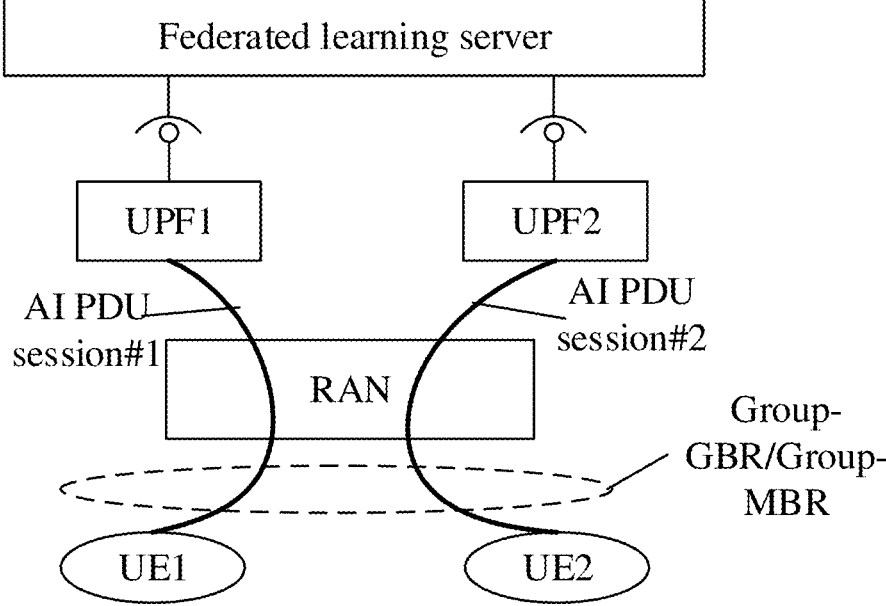

As illustrated in FIG. 5, PDU sessions of different nodes in a node group correspond to a same access network device and correspond to a same UPF. Or, as illustrated in FIG. 6, the PDU sessions of different nodes in the node group correspond to the same access network device and correspond to different UPFs. Or, as illustrated in FIG. 7, the PDU sessions of different nodes in the node group correspond to different access network devices and correspond to a same UPF. Or, as illustrated in FIG. 8, the PDU sessions of different nodes in the node group correspond to different access network devices and correspond to different UPFs.

The embodiments of the present disclosure provide a wireless communication method, a network element, and a device, capable of implementing flexible cross-node resource scheduling to guarantee an overall transmission quality of a plurality of nodes simultaneously.

FIG. 9 is a schematic flowchart illustrating a wireless communication method 410 according to an embodiment of the present disclosure. The method 410 may be performed by a session management network element, e.g., the SMF entity 104 illustrated in FIG. 1. It should be noted that, as an example, the session management network element in the embodiments of the present disclosure may be an SMF entity in a 5G communication system. Of course, the session management network element in the embodiments of the present disclosure may also be an entity having a session management function in other 3GPP communication systems. The present disclosure is not limited in this regard.

As illustrated in FIG. 9, the method 410 may include the following operation.

At S411, a QoS parameter of a QoS flow of a first node in a first node group is determined. The QoS parameter of the QoS flow of the first node is determined based on a QoS parameter of the first node group.

Based on the above technical solution, through an introduction of both the first node group and the QoS parameter of the first node group, the session management network element can determine the QoS parameter of the QoS flow of the first node in the first node group. Therefore, an overall transmission quality of the first node group can be guaranteed on a basis of implementing flexible cross-node resource scheduling in the first node group.

It should be noted that, the solution provided by the embodiments of the present disclosure is intended to adjust a QoS parameter of a node in the first node group based on the QoS parameter of the first node group, or adjust the QoS parameter of the node in the first node group when the QoS parameter of the first node group is constant or unchanged. The embodiments of the present disclosure do not specifically limit the specific QoS parameter of the node in the first node group, as long as, for example, the QoS parameter of the first node group may be guaranteed to be greater than or equal to a sum of QoS parameters of all nodes in the first node group.

In some embodiments of the present disclosure, the first node group includes nodes for a same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and the QoS parameter of the first node group includes a sum of QoS parameters of QoS flows corresponding to the same task among QoS flows carried by PDU sessions of the first node group.

In some embodiments of the present disclosure, the QoS parameter of the first node group may include a Group-GBR and/or a Group-MBR. The Group-GBR is a sum of GBRs of QoS flows of the first node group corresponding to the same task. The Group-MBR is a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, the method 410 may further include: determining a policy control network element of the first node. The policy control network element of the first node is identical to or different from a policy control network element of at least one other node. The at least one other node includes a node in the first node group other than the first node.

Optionally, a session management network element of the first node is identical to a session management network element of the at least one other node, and the policy control network element of the first node is identical to or different from the policy control network element of the at least one other node.

Optionally, a session management network element of the first node is different from a session management network element of the at least one other node, and the policy control network element of the first node is identical to the policy control network element of the at least one other node.

It should be understood that, in the embodiments of the present disclosure, it is only necessary to ensure that the QoS parameter of the QoS flow of the first node may be determined based on the QoS parameter of the first node group. Based on this, it is only necessary to ensure that the session management network element of the first node is identical to the session management network element of the at least one other nodes, or that the policy control network element of the first node is identical to the policy control network element of the at least one other node. A specific implementation is not limited in the embodiments of the present disclosure.

In some embodiments of the present disclosure, the operation at S411 may include: determining, when the QoS parameter of the first node group is constant, the QoS parameter of the QoS flow of the first node based on a quantity of nodes in the first node group and the QoS parameter of the first node group.

For example, when the QoS parameter of the first node group is constant, the SMF may directly convert the QoS parameter of the first node group into the QoS parameter of the QoS flow of the first node based on local configuration information of the SMF and the quantity of the nodes in the first node group. That is, in the embodiments of the present disclosure, the QoS parameter of the QoS flow of the first node may be determined directly by the SMF without an involvement of the PCF.

In some embodiments of the present disclosure, the operation at S411 may include: receiving a QoS parameter of a service flow of the first node transmitted by a policy control network element; and determining the QoS parameter of the QoS flow of the first node based on the QoS parameter of the service flow of the first node.

For example, the SMF receives the QoS parameter of the service flow of the first node transmitted by the policy control network element, and then converts or maps the QoS parameter of the service flow of the first node into the QoS parameter of the QoS flow of the first node. That is, in the embodiments of the present disclosure, with the involvement of the PCF, the QoS parameter of the service flow of the first node determined by the PCF may be converted by the SMF into the QoS parameter of the QoS flow of the first node.

In some embodiments of the present disclosure, the method 410 may further include: receiving the QoS parameter of the first node group transmitted by a UDM.

Optionally, the QoS parameter of the first node group transmitted by the UDM is received when a session to be established by the first node is used for federated learning.

In some embodiments of the present disclosure, the method 410 may further include: transmitting a session establishment or update request to a policy control network element. The session establishment or update request includes the QoS parameter of the first node group.

In some embodiments of the present disclosure, a QoS parameter of a service flow of the first node includes a GBR and/or an MBR, and the QoS parameter of the QoS flow of the first node includes a GFBR and/or an MFBR.

In some embodiments of the present disclosure, the operation at S411 may include: determining a QoS parameter of a QoS flow of the first node for a session establishment procedure and/or a session modification procedure.

That is, the QoS parameter of the QoS flow of the first node determined by the SMF may be applied in the session establishment procedure and/or the session modification procedure.

In some embodiments of the present disclosure, the method 410 may further include: transmitting the QoS parameter of the first node group.

For example, the QoS parameter of the first node group is transmitted to the access network device via an access and mobility management network element.

FIG. 10 is a schematic flowchart illustrating a wireless communication method 420 according to an embodiment of the present disclosure. The method 420 may be performed by a policy control network element, e.g., the PCF entity 106 illustrated in FIG. 1. It should be noted that, as an example, the policy control network element in the embodiments of the present disclosure may be a PCF entity in a 5G communication system. Of course, the policy control network element in the embodiments of the present disclosure may also be an entity having a policy control function in other 3GPP communication systems. The present disclosure is not limited in this regard.

As illustrated in FIG. 10, the method 420 may include the following operations.

At S421, a QoS parameter of a service flow of a first node in a first node group is determined based on a QoS parameter of the first node group.

At S422, the QoS parameter of the service flow of the first node is transmitted to a session management network element.

In some embodiments of the present disclosure, the first node group includes nodes for a same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and the QoS parameter of the first node group includes a sum of QoS parameters of QoS flows corresponding to the same task among QoS flows carried by PDU sessions of the first node group.

In some embodiments of the present disclosure, the QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, a policy control network element of the first node is identical to or different from a policy control network element of at least one other node. The at least one other node includes a node in the first node group other than the first node.

In some embodiments of the present disclosure, a session management network element of the first node is identical to a session management network element of the at least one other node, and the policy control network element of the first node is identical to or different from the policy control network element of the at least one other node.

In some embodiments of the present disclosure, a session management network element of the first node is different from a session management network element of the at least one other node, and the policy control network element of the first node is identical to the policy control network element of the at least one other node.

In some embodiments of the present disclosure, the operation at S421 may include: determining, when the QoS parameter of the first node group is constant, a QoS parameter of a service flow of the first node for a session establishment procedure based on a quantity of nodes in the first node group and the QoS parameter of the first node group.

In some embodiments of the present disclosure, the operation at S421 may include: obtaining first indication information, the first indication information being used to indicate a data processing capacity of a node in the first node group; and determining, when the QoS parameter of the first node group is constant, a QoS parameter of a service flow of the first node for a session modification procedure based on a quantity of the nodes in the first node group, the QoS parameter of the first node group, and the first indication information.

In some embodiments of the present disclosure, the first indication information includes a time at which the node in the first node group uploads data.

In some embodiments of the present disclosure, the first indication information transmitted by a server is received.

In some embodiments of the present disclosure, the method 420 may further include: triggering the session modification procedure based on the first indication information.

In some embodiments of the present disclosure, the method 420 may further include: receiving a session establishment or update request transmitted by the session management network element. The session establishment or update request includes the QoS parameter of the first node group.

In some embodiments of the present disclosure, the QoS parameter of the service flow of the first node includes a GBR and/or an MBR, and a QoS parameter of a QoS flow of the first node includes a GFBR and/or an MFBR.

FIG. 11 is a schematic flowchart illustrating a wireless communication method 430 according to an embodiment of the present disclosure. The method 430 may be performed by a mobility management network element, e.g., the AMF entity 103 illustrated in FIG. 1. It should be noted that, as an example, the mobility management network element in the embodiments of the present disclosure may be an AMF entity in a 5G communication system. Of course, the mobility management network element in the embodiments of the present disclosure may also be an entity having a mobility management function in other 3GPP communication systems. The present disclosure is not limited in this regard.

As illustrated in FIG. 11, the method 430 may include the following operation.

At S431, second indication information is received. The second indication information is used to instruct the access and mobility management network element to select, for a first node, a same session management network element as that of at least one other node, the at least one other node including a node in a first node group other than the first node; or the second indication information is used to instruct the access and mobility management network element to select, for the first node, a session management network element, the session management network element of the first node being identical to or different from a session management network element of the at least one other node.

In some embodiments of the present disclosure, the first node group includes nodes for a same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and a QoS parameter of the first node group includes a sum of QoS parameters of QoS flows corresponding to the same task among QoS flows carried by PDU sessions of the first node group.

In some embodiments of the present disclosure, a QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, the method 430 may further include: determining the session management network element of the first node based on the second indication information.

In some embodiments of the present disclosure, the method 430 may further include: receiving a first message transmitted by the first node. The first message includes first S-NSSAI and/or a first identifier. The first identifier is used to indicate an identifier of a first model. S-NSSAI adopted by the first node group is the first S-NSSAI. A model adopted by the first node group is the first model.

In some embodiments of the present disclosure, a QoS parameter of a service flow of the first node includes a GBR and/or an MBR, and a QoS parameter of a QoS flow of the first node includes a GFBR and/or an MFBR.

FIG. 12 is a schematic flowchart illustrating a wireless communication method 440 according to an embodiment of the present disclosure. The method 440 may be performed by an access network device, e.g., the AN device 102 illustrated in FIG. 1.

As illustrated in FIG. 12, the method 440 may include the following operations.

At S441, capability information of each node in a first node group is obtained. The capability information is used to indicate a capability of the node to process data. The first node group includes nodes for a same task.

At S442, when a QoS parameter of the first node group is constant, a QoS parameter of a QoS flow of each node in the first node group is determined based on the capability information; and/or a session modification procedure is triggered based on the capability information, to modify the QoS parameter of the QoS flow of each node in the first node group.

In some embodiments of the present disclosure, the method 440 may further include: receiving the QoS parameter of the first node group.

In some embodiments of the present disclosure, the capability information includes a time at which the node in the first node group uploads data.

In some embodiments of the present disclosure, the first node group includes the nodes for the same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and the QoS parameter of the first node group includes a sum of QoS parameters of QoS flows corresponding to the same task among QoS flows carried by PDU sessions of the first node group.

In some embodiments of the present disclosure, the QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, a QoS parameter of a service flow of a first node includes a GBR and/or an MBR, and a QoS parameter of a QoS flow of the first node includes a GFBR and/or an MFBR.

It should be noted that the methods related to the above-mentioned session management network element, policy control network element, access and mobility management network element, and access network device may be cross-referenced. That is, corresponding steps in the above-mentioned method 410, method 420, method 430, and method 440 may be cross-referenced.

The solutions of the present disclosure are described below in conjunction with specific embodiments.

Embodiment 1

This embodiment involves a Group-GBR/Group-MBR-based session establishment procedure in a case where a same network slice and/or a same AI model uses a same SMF. Assuming that a node group, i.e., a group of UEs, use a same network slice or a same AI model for transmission of a model training parameter and download of a global model, the network distinguishes a policy related to federated learning from a communication policy of another service being performed by the UE. Thus, the network can adjust the QoS policy of each UE without affecting data transmission of other non-federated learning.

Figure 13:
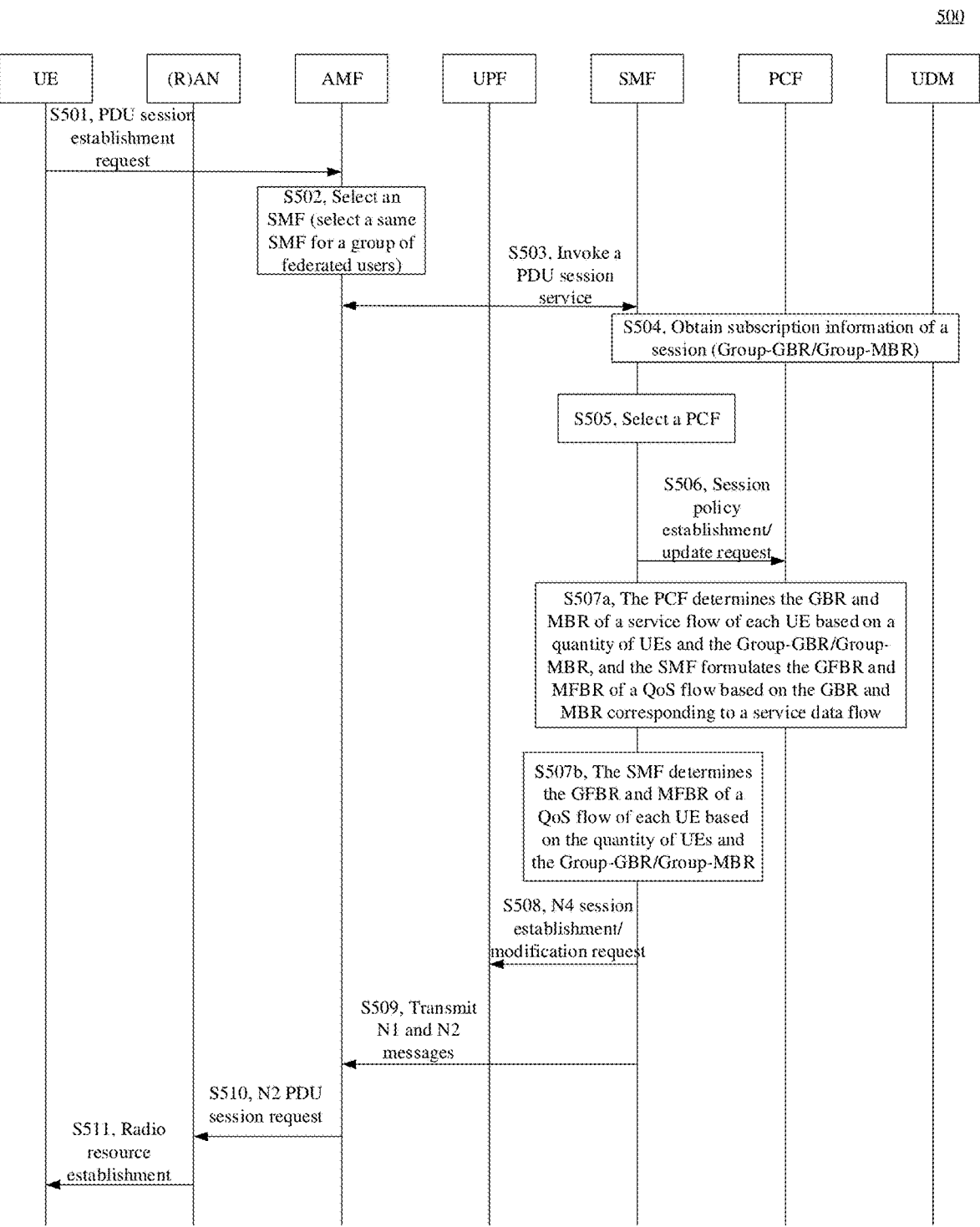

FIG. 13 is a schematic flowchart illustrating a session establishment procedure 500 according to an embodiment of the present disclosure. The method 500 may be performed interactively by a UE, an AN, an AMF, a UPF, an SMF, a PCF, and a UDM, e.g., corresponding entities or network elements illustrated in FIG. 1.

As illustrated in FIG. 13, the session establishment procedure 500 may include some or all of the following operations.

At S501, the UE transmits a session establishment request message to the AMF. The session establishment request message contains S-NSSAI, a Deep Neural Network (DNN), or an identifier of an AI model.

At S502, the SMF obtains subscription data from the UDM. The subscription data indicates a need to select a same SMF as that of at least one other federated node for the S-NSSAI and the DNN or the UE performing training of the AI model.

At S503, the AMF invokes a session service of the selected SMF to trigger session establishment.

At S504, the SMF obtains subscription data of a session from the UDM, and obtains a subscribed Group-GBR/Group-MBR from the UDM when the session is a session for a federated node to perform federated learning.

At S505, the SMF selects a PCF for the session.

At S506, the SMF transmits to the PCF a session establishment/update request containing the subscribed Group-GBR/Group-MBR.

At S507*a*, the PCF determines, based on a quantity of federated nodes provided by a federated learning server and the Group-GBR/Group-MBR provided by the SMF, a GBR and an MBR of a service flow level at which the UE as a federated node establishes the session, and the SMF formulates a GFBR and an MFBR of a corresponding QoS flow of the UE based on the GBR and the MBR.

At S507*b*, the SMF itself can formulate the GFBR and the MFBR of the corresponding QoS flow of the UE based on the Group-GBR/Group-MBR, for a reason that all UEs are managed by a same SMF.

It should be noted that the operations at S507*a* and S507*b* are two implementations for formulating the GFBR and the MFBR of the corresponding QoS flow of the UE. In practice, one of the two implementations may be chosen to implement the solution of this embodiment.

At S508, the SMF transmits an N4 session establishment modification request to the UPF and allocates core network tunnel information (CN tunnel info).

At S509, the SMF provides, to the AMF, the GFBR and the MFBR that are formulated based on the Group-GBR/Group-MBR, and transmits the GFBR and the MFBR to the RAN through the AMF.

At S510, an N2 message containing the GFBR and the MFBR is transmitted to the base station.

At S511, the RAN performs corresponding establishment of a radio resource based on a received QoS parameter.

In this embodiment, the SMF and/or the PCF formulates the QoS parameter of a corresponding group of UEs through obtaining the subscribed Group-GBR/Group-MBR, enabling the network to guarantee a quality of service for the group of nodes.

Embodiment 2

This embodiment involves a Group-GBR/Group-MBR-based session establishment procedure in a case where a same network slice and/or a same AI model uses a same PCF. That is, when nodes in a node group perform federated learning, different SMFs may be selected for different UEs to establish a session based on a same network slice or a same AI model. However, these SMFs need to select a same PCF to formulate a unified session policy based on a group of nodes.

Figure 14:
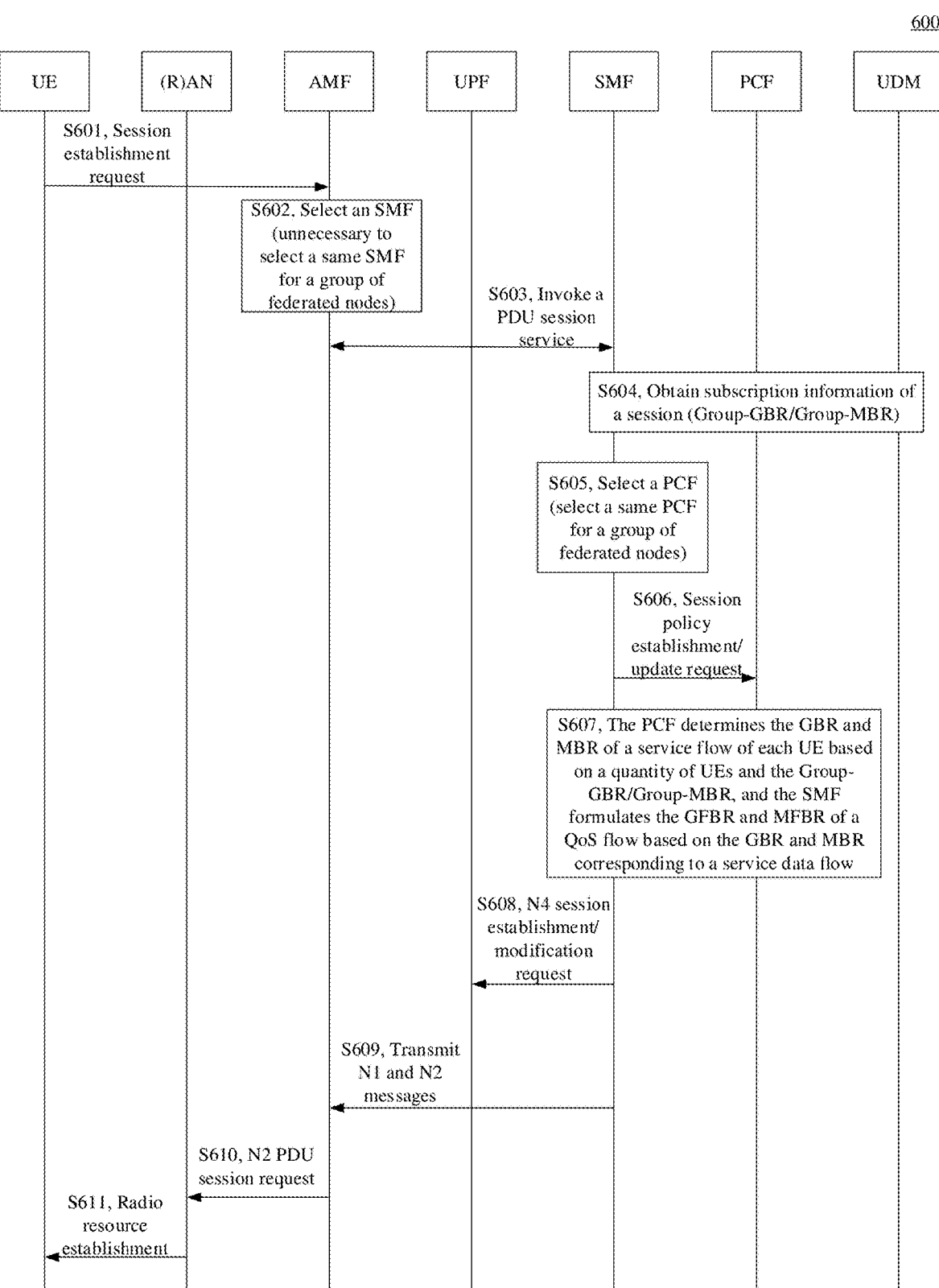

FIG. 14 is a schematic flowchart illustrating a session establishment procedure 600 according to an embodiment of the present disclosure. The method 600 may be performed interactively by a UE, an AN, an AMF, a UPF, an SMF, a PCF, and a UDM, e.g., corresponding entities or network elements illustrated in FIG. 1.

As illustrated in FIG. 14, the session establishment procedure 600 may include some or all of the following operations.

At S601, the UE transmits a session establishment request message to the AMF. The session establishment request message contains S-NSSAI, a DNN, or an identifier of an AI model.

At S602, the SMF obtains subscription data from the UDM. The subscription data indicates a need to select an SMF for the S-NSSAI and the DNN or the UE performing training of the AI model, but it is unnecessary to select a same SMF for a group of nodes.

At S603, the AMF invokes a session service of the selected SMF to trigger session establishment.

At S604, the SMF obtains subscription data of a session from the UDM, and obtains a subscribed Group-GBR/Group-MBR from the UDM when the session is a session for a federated node to perform federated learning.

At S605, the SMF selects a PCF for the session. A group of federated nodes performing federated learning need to select a same PCF.

At S606, the SMF transmits to the PCF a session establishment/update request containing the subscribed Group-GBR/Group-MBR.

At S607, the PCF determines, based on a quantity of federated nodes provided by a federated learning server and the Group-GBR/Group-MBR provided by the SMF, a GBR and an MBR of a service flow level at which the UE as a federated node establishes the session, and the SMF formulates a GFBR and an MFBR of a corresponding QoS flow of the UE based on the GBR and the MBR.

At S608, the SMF transmits an N4 session establishment modification request to the UPF and allocates core network tunnel information (CN tunnel info).

At S609, the SMF provides, to the AMF, the GFBR and the MFBR that are formulated based on the Group-GBR/Group-MBR, and transmits the GFBR and the MFBR to the RAN through the AMF.

At S610, an N2 message containing the GFBR and the MFBR is transmitted to the base station.

At S611, the RAN performs corresponding establishment of a radio resource based on a received QoS parameter.

In this embodiment, the SMF and/or the PCF formulates the QoS parameter of a corresponding group of UEs through obtaining the subscribed Group-GBR/Group-MBR, enabling the network to guarantee a quality of service for the group of nodes.

Embodiment 3

In this embodiment, Group-GBR/Group-MBR-based resource sharing between federated nodes is implemented on a core network side. Due to differences in computing power between different federated nodes, times at which individual nodes complete training and transmit results vary. As a result, efficient information transmission of a group of nodes fails to be guaranteed based only on the GFBR and the MFBR that are formulated in the session establishment procedure. Therefore, to maximize an application of the Group-GBR/Group-MBR and guarantee overall performance of the group of nodes, rather than performance of individual nodes, it is necessary to enable flexible sharing of radio resources between individual nodes to achieve efficient iterative training.

Figure 15:
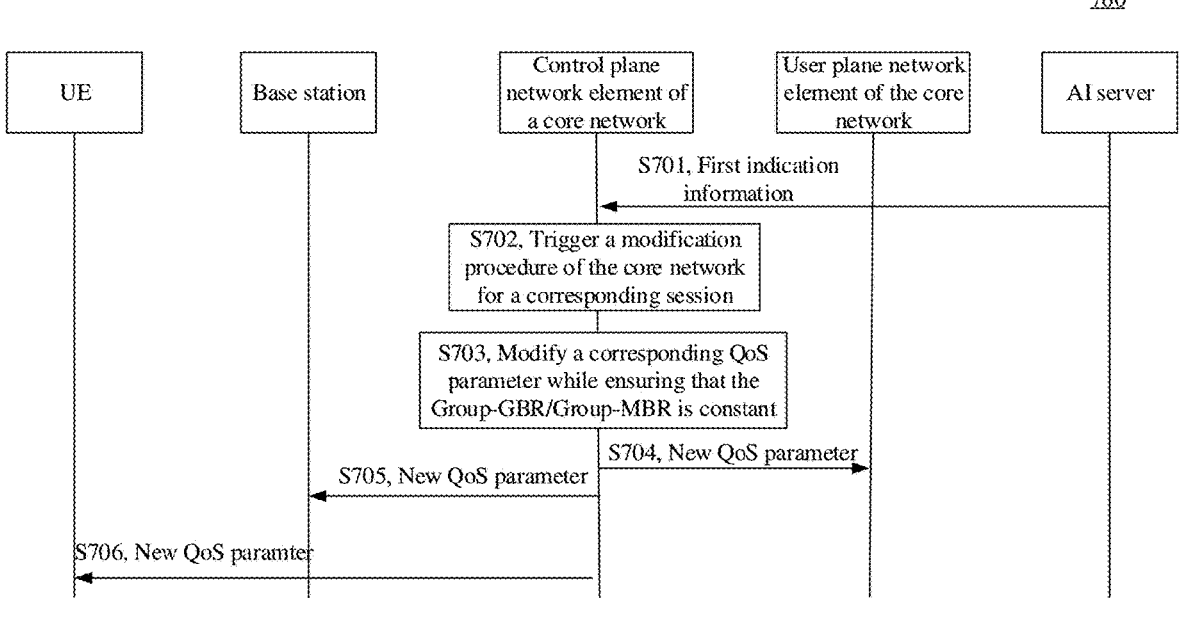

FIG. 15 is a schematic flowchart illustrating a wireless communication method 700 according to an embodiment of the present disclosure. The method 700 may be executed interactively by the UE, the base station, a control plane network element of the core network, a user plane network element of the core network, and the AI server. For example, the control plane network element of the core network may also be a policy control network element, the user plane network element of the core network may be a user plane function network element, and the AI server may be a server having a learning capability or a data processing capability.

As illustrated in FIG. 15, the method 700 may include some or all of the following operations.

At S701, first indication information is introduced. The AI server indicates, to the control plane network element of the core network, received times at which a set of federated nodes upload training result data.

At S702, a network element of the core network triggers a session modification procedure based on the first indication information.

At S703, a QoS parameter of a corresponding session of a corresponding UE is modified based on the first indication information when the Group-GBR/Group-MBR is constant. For example, a value of the GFBR and a value of the MFBR are reduced for a UE transmitting data early, and a value of the GFBR and a value of the MFBR are increased for a UE transmitting data late.

At S704, a control plane of the core network transmits a new QoS parameter value to the user plane network element of the core network.

At S705, the control plane of the core network transmits the new QoS parameter value to the base station, and instructs the base station to schedule a radio resource of an intra-group node.

At S706, the control plane of the core network transmits the new QoS parameter value to the UE for transmission of uplink data of the UE.

In this embodiment, through an introduction of the first indication information, radio resources of different UEs are flexibly allocated on the core network side under a condition that the Group-GBR/Group-MBR remains unchanged, eliminating differences in time at which the group of nodes complete data transmission due to variations in computing capabilities of the UEs, and efficiently completing a training iteration by the group of nodes.

Embodiment 4

In this embodiment, Group-GBR/Group-MBR-based resource sharing between federated nodes is implemented on a base station side. When accesses of a group of federated nodes are all implemented through a same base station to transmit federated learning data, the base station side can flexibly adjust, under a condition of ensuring that the overall Group-GBR/Group-MBR remains unchanged, radio resources of the nodes based on times of receiving data uploaded by different nodes, to increase a data transmission rate corresponding to a UE having low computing power and decrease a data transmission rate corresponding to a UE having high computing power.

Figure 16:
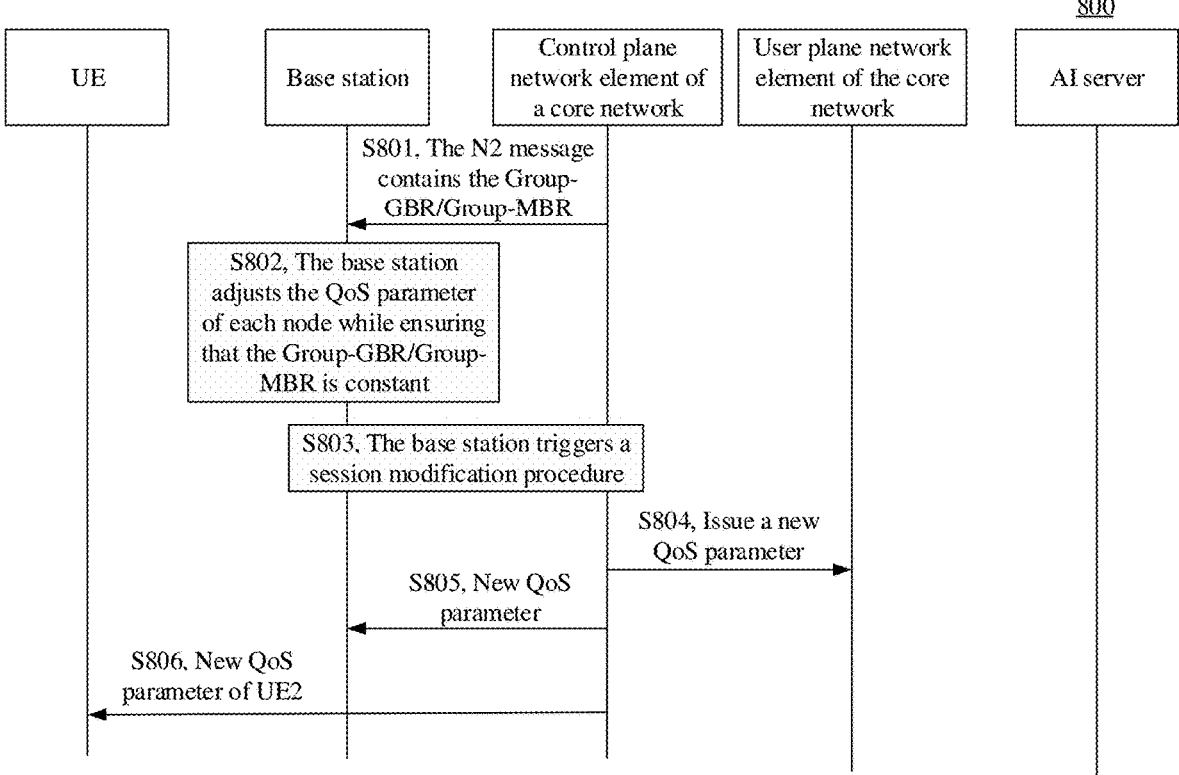

FIG. 16 is a flowchart illustrating a wireless communication method 800 according to an embodiment of the present disclosure. The method 800 may be executed interactively by the UE, the base station, a control plane network element of the core network, a user plane network element of the core network, and the AI server. For example, the control plane network element of the core network may also be a policy control network element, the user plane network element of the core network may be a user plane function network element, and the AI server may be a server having a learning capability or a data processing capability.

As illustrated in FIG. 16, the method 800 may include some or all of the following operations.

At S801, the base station obtains, from a network element of the core network, a Group-GBR/Group-MBR parameter for a set of nodes.

At S802, the base station may adjust, on a basis of ensuring that the Group-GBR/Group-MBR is constant, the QoS parameter of each node based on times of receiving data transmitted by different nodes. For example, a value of the GFBR and a value of the MFBR are reduced for a UE transmitting data early, and a value of the GFBR and a value of the MFBR are increased for a UE transmitting data late.

At S803, the base station triggers the session modification procedure.

Reference to S804 to S806 can be made to S704 to S706 in Embodiment 3, and thus details thereof will be omitted herein to avoid repetition.

In this embodiment, through obtaining the Group-GBR/Group-MBR, the base station flexibly modifies QoS parameters of a group of UEs under a condition that the Group-GBR/Group-MBR remains unchanged, eliminating the differences in the times at which the group of nodes complete the data transmission due to the variations in the computing capabilities of the UEs, and efficiently completing the training iteration by the group of nodes.

In summary, the solutions provided by the embodiments of the present disclosure enable the network to guarantee the quality of service of the group of nodes, and also to implement, based on the differences in the communication qualities between different nodes in the group, the flexible cross-UE resource scheduling to ensure that the group of nodes complete a training iteration of the federated learning efficiently.

Preferred implementations of the present disclosure are described in detail above in conjunction with the accompanying drawings. However, the present disclosure is not limited to specific details in the above implementations. A variety of simple variants of the technical solutions of the present disclosure can be made within the technical concept of the present disclosure, and shall fall within the scope of the present disclosure. For example, various specific technical features described in the above specific implementations can be combined in any suitable way, without contradiction. To avoid unnecessary repetitions, separate description of various possible combinations will be omitted in the present disclosure. For example, arbitrary combinations may be performed on various implementations of the present disclosure, as long as these arbitrary combinations do not contradict the concept of the present disclosure. These arbitrary combinations shall likewise be construed as contents disclosed in the present disclosure.

Figures 17, 18, 19, 20, 21:
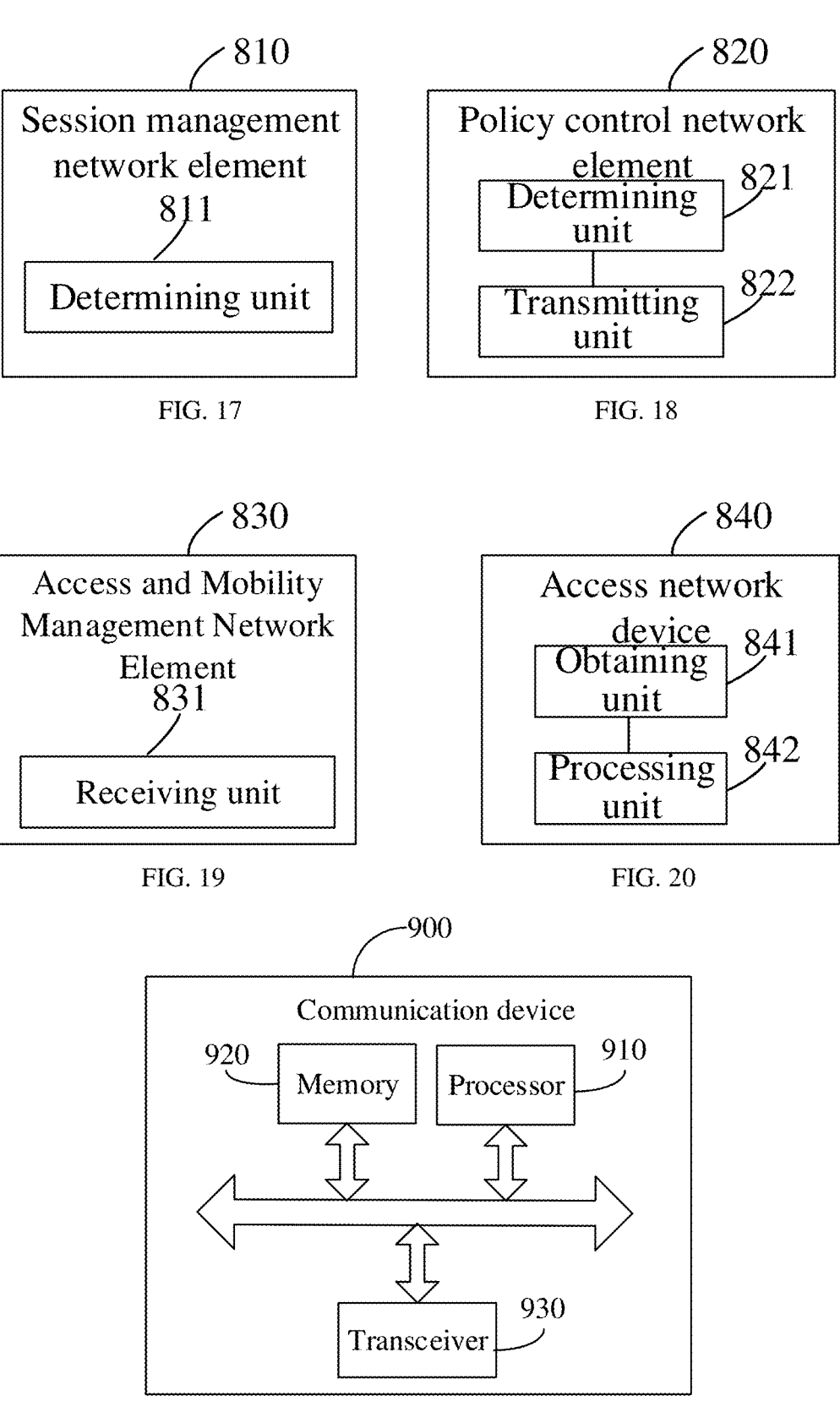
FIG. 17 is a schematic block diagram showing a session management network element according to an embodiment of the present disclosure.
FIG. 18 is a schematic block diagram showing a policy control network element according to an embodiment of the present disclosure.
FIG. 19 is a schematic block diagram showing an access and mobility management network element according to an embodiment of the present disclosure.
FIG. 20 is a schematic block diagram showing an access network device according to an embodiment of the present disclosure.
FIG. 21 is a schematic block diagram showing a communication device according to an embodiment of the present disclosure.

FIG. 17 is a schematic block diagram showing a session management network element 810 according to an embodiment of the present disclosure.

As illustrated in FIG. 17, the session management network element 810 can include a determining unit 811. The determining unit 811 is configured to determine a QoS parameter of a QoS flow of a first node in a first node group. The QoS parameter of the QoS flow of the first node is determined based on a QoS parameter of the first node group.

In some embodiments of the present disclosure, the first node group includes nodes for a same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and the QoS parameter of the first node group includes a sum of QoS parameters of QoS flows corresponding to the same task among QoS flows carried by PDU sessions of the first node group.

In some embodiments of the present disclosure, the QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, the determining unit 811 is further configured to determine a policy control network element of the first node. The policy control network element of the first node is identical to or different from a policy control network element of at least one other node. The at least one other node includes a node in the first node group other than the first node.

In some embodiments of the present disclosure, a session management network element of the first node is identical to a session management network element of the at least one other node, and the policy control network element of the first node is identical to or different from the policy control network element of the at least one other node.

In some embodiments of the present disclosure, a session management network element of the first node is different from a session management network element of the at least one other node, and the policy control network element of the first node is identical to the policy control network element of the at least one other node.

In some embodiments of the present disclosure, the determining unit 811 is specifically configured to determine, when the QoS parameter of the first node group is constant, the QoS parameter of the QoS flow of the first node based on a quantity of nodes in the first node group and the QoS parameter of the first node group.

In some embodiments of the present disclosure, the determining unit 811 is specifically configured to: receive a QoS parameter of a service flow of the first node transmitted by a policy control network element; and determine the QoS parameter of the QoS flow of the first node based on the QoS parameter of the service flow of the first node.

In some embodiments of the present disclosure, the determining unit 811 is further configured to receive the QoS parameter of the first node group transmitted by a UDM.

In some embodiments of the present disclosure, the determining unit 811 is specifically configured to: receive the QoS parameter of the first node group transmitted by the UDM, when a session to be established by the first node is used for federated learning.

In some embodiments of the present disclosure, the determining unit 811 is further configured to transmit a session establishment or update request to a policy control network element. The session establishment or update request includes the QoS parameter of the first node group.

In some embodiments of the present disclosure, a QoS parameter of a service flow of the first node includes a GBR and/or an MBR, and the QoS parameter of the QoS flow of the first node includes a GFBR and/or an MFBR.

In some embodiments of the present disclosure, the determining unit 811 is further configured to determine a QoS parameter of a QoS flow of the first node for a session establishment procedure and/or a session modification procedure.

In some embodiments of the present disclosure, the determining unit 811 is further configured to transmit the QoS parameter of the first node group.

FIG. 18 is a schematic block diagram showing a policy control network element 820 according to an embodiment of the present disclosure.

As illustrated in FIG. 18, the policy control network element 820 can include a determining unit 821 and a transmitting unit 822. The determining unit 821 is configured to determine a QoS parameter of a service flow of a first node in a first node group based on a QoS parameter of the first node group. The transmitting unit 822 is configured to transmit the QoS parameter of the service flow of the first node to a session management network element.

In some embodiments of the present disclosure, the first node group includes nodes for a same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and the QoS parameter of the first node group includes a sum of QoS parameters of QoS flows corresponding to the same task among QoS flows carried by PDU sessions of the first node group.

In some embodiments of the present disclosure, the QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, a policy control network element of the first node is identical to or different from a policy control network element of at least one other node. The at least one other node includes a node in the first node group other than the first node.

In some embodiments of the present disclosure, a session management network element of the first node is identical to a session management network element of the at least one other node, and the policy control network element of the first node is identical to or different from the policy control network element of the at least one other node.

In some embodiments of the present disclosure, a session management network element of the first node is different from a session management network element of the at least one other node, and the policy control network element of the first node is identical to the policy control network element of the at least one other node.

In some embodiments of the present disclosure, the determining unit 821 is specifically configured to determine, when the QoS parameter of the first node group is constant, a QoS parameter of a service flow of the first node for a session establishment procedure based on a quantity of nodes in the first node group and the QoS parameter of the first node group.

In some embodiments of the present disclosure, the determining unit 821 is specifically configured to: obtain first indication information, the first indication information being used to indicate a data processing capacity of a node in the first node group; and determine, when the QoS parameter of the first node group is constant, a QoS parameter of a service flow of the first node for a session modification procedure based on a quantity of the nodes in the first node group, the QoS parameter of the first node group, and the first indication information.

In some embodiments of the present disclosure, the first indication information includes a time at which the node in the first node group uploads data.

In some embodiments of the present disclosure, the first indication information transmitted by a server is received.

In some embodiments of the present disclosure, the determining unit 821 is further configured to trigger the session modification procedure based on the first indication information.

In some embodiments of the present disclosure, the transmitting unit 822 is further configured to receive a session establishment or update request transmitted by the session management network element. The session establishment or update request includes the QoS parameter of the first node group.

In some embodiments of the present disclosure, the QoS parameter of the service flow of the first node includes a GBR and/or an MBR, and a QoS parameter of a QoS flow of the first node includes a GFBR and/or an MFBR.

FIG. 19 is a schematic block diagram showing an access and mobility management network element 830 according to an embodiment of the present disclosure.

As illustrated in FIG. 19, the access and mobility management network element 830 can include a receiving unit 831. The receiving unit 831 is configured to receive second indication information. The second indication information is used to instruct the access and mobility management network element to select, for a first node, a same session management network element as that of at least one other node, the at least one other node including a node in a first node group other than the first node; or the second indication information is used to instruct the access and mobility management network element to select, for the first node, a session management network element, the session management network element of the first node being identical to or different from a session management network element of the at least one other node.

In some embodiments of the present disclosure, the first node group includes nodes for a same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and a QoS parameter of the first node group includes a sum of QoS parameters of QoS flows corresponding to the same task among QoS flows carried by PDU sessions of the first node group.

In some embodiments of the present disclosure, a QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, the receiving unit 831 is further configured to determine the session management network element of the first node based on the second indication information.

In some embodiments of the present disclosure, the receiving unit 831 is further configured to receive a first message transmitted by the first node. The first message includes first S-NSSAI and/or a first identifier. The first identifier is used to indicate an identifier of a first model. S-NSSAI adopted by the first node group is the first S-NSSAI. A model adopted by the first node group is the first model.

In some embodiments of the present disclosure, a QoS parameter of a service flow of the first node includes a GBR and/or an MBR, and a QoS parameter of a QoS flow of the first node includes a GFBR and/or an MFBR.

FIG. 20 is a schematic block diagram showing an access network device 840 according to an embodiment of the present disclosure.

As illustrated in FIG. 20, the access network device 840 can include an obtaining unit 841 and a processing unit 842. The obtaining unit 841 is configured to obtain capability information of each node in a first node group. The capability information is used to indicate a capability of the node to process data. The first node group includes nodes for a same task. The processing unit 842 is configured to: determine, when a QoS parameter of the first node group is constant, a QoS parameter of a QoS flow of each node in the first node group based on the capability information; and/or trigger a session modification procedure based on the capability information, to modify the QoS parameter of the QoS flow of each node in the first node group.

In some embodiments of the present disclosure, the processing unit 842 is further configured to receive the QoS parameter of the first node group.

In some embodiments of the present disclosure, the capability information includes a time at which the node in the first node group uploads data.

In some embodiments of the present disclosure, the first node group includes the nodes for the same task.

In some embodiments of the present disclosure, the same task includes a task of transmitting a model training parameter using a same network slice and/or a task of downloading a global model using a same network slice; and/or the same task includes a task of transmitting a model training parameter for a same model and/or a task of downloading a global model for a same model.

In some embodiments of the present disclosure, each node in the first node group corresponds to one PDU session, the one PDU session being used to carry at least one QoS flow; and the QoS parameter of the first node group includes a sum of QoS parameters of QoS flows corresponding to the same task among QoS flows carried by PDU sessions of the first node group.

In some embodiments of the present disclosure, the QoS parameter of the first node group includes a Group-GBR and/or a Group-MBR. The Group-GBR is a sum of GBRs of QoS flows of the first node group corresponding to the same task, or the Group-MBR is a sum of MBRs of QoS flows of the first node group corresponding to the same task; or the Group-GBR is a maximum achievable value of a sum of GBRs of QoS flows of the first node group corresponding to the same task, or the Group-MBR is a maximum achievable value of a sum of MBRs of QoS flows of the first node group corresponding to the same task.

In some embodiments of the present disclosure, PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

In some embodiments of the present disclosure, a QoS parameter of a service flow of a first node includes a GBR and/or an MBR, and a QoS parameter of a QoS flow of the first node includes a GFBR and/or an MFBR.

It should be understood that the device embodiments and the method embodiments may correspond to each other. Similar description of the device embodiments can be referred to the method embodiments. Specifically, the session management network element 810, the policy control network element 820, the access and mobility management network element 830, and the access network device 840 mentioned above may correspond to corresponding subjects in the methods for performing the embodiments of the present disclosure. In addition, the above and other operations and/or functions of each unit in the session management network element 810, the policy control network element 820, the access and mobility management network element 830, and the access network device 840 mentioned above are intended to implement corresponding processes in each method. For simplicity, details thereof will be omitted herein.

The communication device according to the embodiments of the present disclosure is described above in connection with the accompanying drawings from the perspective of a functional module. It should be understood that the functional module can be implemented in the form of hardware, or in the form of instructions in software, or in a combination of hardware and software modules.

Specifically, the steps of the method embodiments in the embodiments of the present disclosure may be accomplished by an integrated logic circuit in the form of hardware and/or instructions in the form of software in a processor. The steps of the method disclosed in combination with the embodiments of the present disclosure may be directly embodied as being performed by a hardware decoding processor, or by a combination of hardware and software modules in the decoding processor.

Optionally, the software modules can be located in a known storage medium in the related art, such as random access memory, a flash memory, a read-only memory, a programmable read-only memory, an electrically erasable programmable memory, or a register. The storage medium can be located in the memory. The processor can read information from the memory and perform the steps of the above method embodiments in combination with its hardware.

For example, the processing unit and the communication unit mentioned above may be implemented by a processor and a transceiver, respectively.

FIG. 21 is a block diagram showing a structure of a communication device 900 according to an embodiment of the present disclosure.

As illustrated in FIG. 21, the communication device 900 may include a processor 910.

The processor 910 may invoke and execute a computer program from a memory to implement the method according to any of the embodiments of the present disclosure.

Referring to FIG. 21, the communication device 900 may further include a memory 920.

The memory 920 can be configured to store indication information, and can also be configured to store codes, instructions, etc., executed by the processor 910. The processor 910 may invoke and execute a computer program from the memory 920 to implement the method according to any of the embodiments of the present disclosure. The memory 920 may be a separate component independent of the processor 910, or may be integrated in the processor 910.

Referring to FIG. 21, the communication device 900 may further include a transceiver 930.

The processor 910 may control the transceiver 930 to communicate with other devices, specifically, to transmit information or data to other devices, or receive information or data transmitted by other devices. The transceiver 930 may include a transmitter and a receiver. The transceiver 930 may further include one or more antennas.

It should be understood that various components of the communication device 900 are connected via a bus system. The bus system includes a power bus, a control bus, and a state signal bus in addition to a data bus.

It should also be understood that the communication device 900 may be a terminal device according to the embodiments of the present disclosure. Also, the communication device 900 can implement corresponding processes implemented by the session management network element, the policy control network element, the access and mobility management network element, or the access network device in each of the methods according to the embodiments of the present disclosure. That is, the communication device 900 according to the embodiments of the present disclosure may correspond to the session management network element 810, the policy control network element 820, the access and mobility management network element 830, and the access network device 840 mentioned above, and may correspond to a corresponding subject in performing the method according to the embodiments of the present disclosure. In this case, the transceiver 930 can correspondingly implement operations and/or functions implemented by the transmitting unit 822 in the policy control network element 820, the receiving unit 831 in the access and mobility management network element 830, or the obtaining unit 841 in the access network device 840, and the processor 910 can correspondingly implement operations and/or functions implemented by the determining unit 811 in the session management network element 810, the determining unit 821 in the policy control network element 820, or the processing unit 842 in the access network device 840. For simplicity, details thereof will be omitted herein.

In addition, a chip is further provided according to the embodiments of the present disclosure.

For example, the chip may be an integrated circuit chip with a signal processing capability, and can implement or perform the methods, steps, and logical block diagrams disclosed in the embodiments of the present disclosure. The chip may also be referred to as a system-level chip, a system-chip, a chip system, or a system-on-chip. Optionally, the chip may be applied in various communication devices to cause a communication device provided with the chip to perform the methods, steps and logical block diagrams disclosed in embodiments of the present disclosure.

Figure 22:
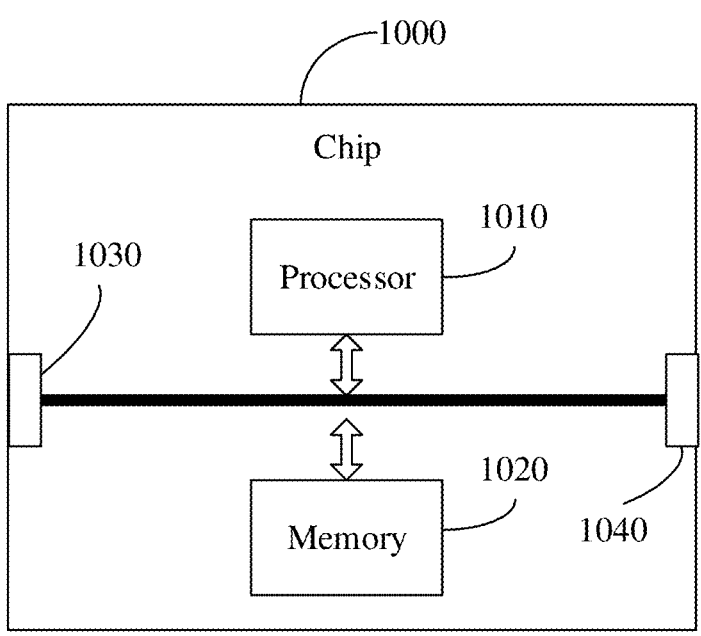
FIG. 22 is a schematic block diagram showing a chip according to an embodiment of the present disclosure.

FIG. 22 is a schematic block diagram showing a structure of a chip 1000 according to an embodiment of the present disclosure.

As illustrated in FIG. 22, the chip 1000 includes a processor 1010.

The processor 1010 can invoke and execute a computer program from a memory to implement the method according to any of the embodiments of the present disclosure.

Referring to FIG. 22, the chip 1000 may further include a memory 1020.

The processor 1010 may invoke and execute a computer program from the memory 1020 to implement the method according to any of the embodiments of the present disclosure. The memory 1020 may be configured to store instruction information, and may further be configured to store codes, instructions, etc., executed by the processor 1010. The memory 1020 may be a separate component independent of the processor 1010, or may be integrated in the processor 1010.

Referring to FIG. 22, the chip 1000 may further include an input interface 1030.

The processor 1010 may control the input interface 1030 to communicate with other devices or chips, specifically, to obtain information or data transmitted by other devices or chips.

Referring to FIG. 22, the chip 1000 may further include an output interface 1040.

The processor 1010 may control the output interface 1040 to communicate with other devices or chips, specifically, to output information or data to other devices or chips.

It should be understood that the chip 1000 may be applied in the session management network element, the policy control network element, the access and mobility management network element, or the access network device according to the embodiments of the present disclosure, and may implement the corresponding processes implemented by the session management network element, the policy control network element, the access and mobility management network element, or the access network device in any of the methods according to the embodiments of the present disclosure. For simplicity, details thereof will be omitted herein.

It should further be understood that various components of the chip 1000 are connected via a bus system. The bus system includes a power bus, a control bus, and a state signal bus in addition to a data bus.

The processor mentioned above may include, but is not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The processor may be configured to implement or perform each method, step, and logical block diagram disclosed in the embodiments of the present disclosure. The steps of the method disclosed in conjunction with the embodiments of the present disclosure may be directly embodied as being performed by a hardware decoding processor, or by a combination of hardware and software modules in the decoding processor. The software module can be located in a known storage medium in the related art, such as a random access memory, a flash memory, a read-only memory, a programmable read-only memory, an erasable programmable memory, or a register. The storage medium is located in the memory. The processor reads information from the memory and performs the steps of the above method in combination with its hardware.

The memory mentioned above includes, but is not limited to, a volatile memory and/or a non-volatile memory. The non-volatile memory may be a Read-Only Memory (ROM), a Programmable ROM (PROM), an Erasable PROM (EPROM), an Electrically EPROM (EPROM), or a flash memory. The volatile memory may be a Random Access Memory (RAM), which is used as an external cache. As illustrative, rather than limiting, many forms of RAMs are available, including for example a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM)), and a Direct Rambus RAM (DR RAM).

It should be noted that the memory described in the present disclosure is intended to include these and any other suitable types of memories.

The embodiments of the present disclosure further provide a computer-readable storage medium configured to store a computer program. The computer-readable storage medium stores one or more programs. The one or more programs include instructions. The instructions, when executed by a portable electronic device including a plurality of applications, enable the portable electronic device to perform the method according to any of the method embodiments.

Optionally, the computer-readable storage medium may be applied in the session management network element, the policy control network element, the access and mobility management network element, or the access network device according to the embodiments of the present disclosure. The computer program causes a computer to perform corresponding processes implemented by a corresponding execution body in each of the methods according to the embodiments of the present disclosure. For brevity, details thereof will be omitted herein.

The embodiments of the present disclosure further provide a computer program product including a computer program.

Optionally, the computer program product may be applied in the session management network element, the policy control network element, the access and mobility management network element, or the access network device according to the embodiments of the present disclosure. The computer program causes a computer to perform corresponding processes implemented by a corresponding execution body in each of the methods according to the embodiments of the present disclosure. For brevity, details thereof will be omitted herein.

The embodiments of the present disclosure further provide a computer program. The computer program, when executed by a computer, causes the computer to perform the method according to any of the method embodiments.

Optionally, the computer program may be applied in the session management network element, the policy control network element, the access and mobility management network element, or the access network device according to the embodiments of the present disclosure. The computer program, when executed on a computer, causes the computer to perform corresponding processes implemented by a corresponding execution body in each of the methods according to the embodiments of the present disclosure. For brevity, details thereof will be omitted herein.

In addition, the embodiments of the present disclosure further provide a communication system. The communication system may include the terminal device and the network device mentioned above to form the communication system as illustrated in FIG. 1. For brevity, details thereof will be omitted herein. It should be noted that the term "system" etc., in the present disclosure may also be referred to as a "network management architecture", a "network system", or the like.

It should also be understood that the terms used in the embodiments of the present disclosure and the appended claims are only for a purpose of describing specific embodiments, and are not intended to limit the embodiments of the present disclosure. For example, singular forms of "a", "said", "above", and "the" used in the embodiments of the present disclosure and appended claims also include plural forms, unless the context clearly indicates other meanings.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the function is implemented in the form of a software functional unit and sold or used as a standalone product, it can be stored in a computer-readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various media capable of storing program codes, such as a Universal Serial Bus flash drive, a mobile hard disk, an ROM, an RAM, a magnetic disk, or an optical disc.

Those skilled in the art can clearly understand that, for the convenience and conciseness of the description, for the specific operation processes of the systems, devices, and units described above, reference can be made to the corresponding processes in the foregoing method embodiments, and details thereof will be omitted herein.

In the embodiments of the present disclosure, it can be appreciated that the disclosed systems, devices, and methods may be implemented in other ways. For example, the divisions of the units or modules or components in the above-mentioned device embodiments are only divisions based on logical functions, and there may be other divisions in actual implementations. For example, more than one unit or module or component may be combined or integrated into another system, or some units or modules or components can be ignored or omitted. For example, the units/modules/components described as separate/display components may or may not be physically separated, that is, they may be co-located or distributed across a number of network elements. Some or all of the units/modules/components may be selected as desired to achieve the objects of the embodiments of the present disclosure.

While the specific implementations of the embodiments of the present disclosure have been described above, the scope of the embodiments of the present disclosure is not limited to these implementations. Various variants and alternatives can be easily conceived by any of those skilled in the art without departing from the technical scope of the embodiments of the present disclosure. Therefore, these variants and alternatives are to be encompassed by the scope of the embodiments of the present disclosure as defined by the claims as appended.

What is claimed is:

1. A session management network element, comprising:
a processor and a memory, wherein the memory has a computer program stored thereon, and the processor is configured to invoke and execute the computer program stored in the memory to perform a wireless communication method comprising:
receiving a Quality of Service (QOS) parameter of a service flow of a first node in a first node group transmitted by a policy control network element, the QoS parameter of the service flow of the first node being determined based on a QoS parameter of the first node group; and
determining a QoS parameter of a QoS flow of a first node in the first node group, based on the QoS parameter of the service flow of the first node;
wherein the QoS parameter of the first node group comprises a Group-Maximum Bit Rate (Group-MBR), wherein the Group-MBR is a maximum achievable value of a sum of MBRs of QoS flows of the first node group corresponding to a same task.

2. The session management network element according to claim 1, wherein:
each node in the first node group corresponds to one Protocol Data Unit (PDU) session, the one PDU session being used to carry at least one QoS flow; and
the QoS parameter of the first node group comprises a sum of QOS parameters of QoS flows corresponding to a same task among QoS flows carried by PDU sessions of the first node group.

3. The session management network element according to claim 1, wherein:
PDU sessions of different nodes in the first node group correspond to a same access network device and a same User Plane Function (UPF); or
the PDU sessions of different nodes in the first node group correspond to a same access network device and different UPFs; or
the PDU sessions of different nodes in the first node group correspond to different access network devices and a same UPF; or
the PDU sessions of different nodes in the first node group correspond to different access network devices and different UPFs.

4. The session management network element according to claim 1, wherein a session management network element of the first node is identical to a session management network element of at least one other node, and a policy control network element of the first node is identical to or different from a policy control network element of the at least one other node, or
the session management network element of the first node is different from the session management network element of the at least one other node, and the policy control network element of the first node is identical to the policy control network element of the at least one other node.

5. The session management network element according to claim 1, wherein the QoS parameter of the service flow of the first node being determined based on a QoS parameter of the first node group comprises:

when the QoS parameter of the first node group is constant, a QoS parameter of a service flow of the first node for a session establishment procedure being determined based on a quantity of nodes in the first node group and the QoS parameter of the first node group.

6. The session management network element according to claim 1, wherein the QoS parameter of the service flow of the first node being determined based on a QoS parameter of the first node group comprises:

when the QoS parameter of the first node group is constant, a QoS parameter of a service flow of the first node for a session establishment procedure being determined based on a quantity of nodes in the first node group, the QoS parameter of the first node group, and a data processing capacity of a node in the first node group.

7. A wireless communication method, applicable in a policy control network element, the method comprising:

determining a QoS parameter of a service flow of a first node in a first node group based on a QoS parameter of the first node group; and transmitting the QoS parameter of the service flow of the first node to a session management network element;

wherein the QoS parameter of the first node group comprises a Group-MBR, wherein the Group-MBR is a maximum achievable value of a sum of MBRs of QoS flows of the first node group corresponding to a same task.

8. The method according to claim 7, wherein:

each node in the first node group corresponds to one PDU session, the one PDU session being used to carry at least one QoS flow; and the QoS parameter of the first node group comprises a sum of QOS parameters of QoS flows corresponding to a same task among QoS flows carried by PDU sessions of the first node group.

9. The method according to claim 7, wherein:

PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

10. The method according to claim 7, wherein a session management network element of the first node is identical to a session management network element of at least one other node, and wherein a policy control network element of the first node is identical to or different from a policy control network element of the at least one other node, or the session management network element of the first node is different from the session management network element of the at least one other node, and the policy control network element of the first node is identical to the policy control network element of the at least one other node.

11. The method according to claim 7, wherein said determining the QoS parameter of the service flow of the first node in the first node group based on the QoS parameter of the first node group comprises:

determining, when the QoS parameter of the first node group is constant, a QoS parameter of a service flow of the first node for a session establishment procedure based on a quantity of nodes in the first node group and the QOS parameter of the first node group.

12. A policy control network element, comprising:

a processor and a memory, wherein the memory has a computer program stored thereon, and the processor is configured to invoke and execute the computer program stored in the memory to perform a wireless communication method comprising:

determining a QoS parameter of a service flow of a first node in a first node group based on a QoS parameter of the first node group; and transmitting the QoS parameter of the service flow of the first node to a session management network element;

wherein the QoS parameter of the first node group comprises a Group-MBR, wherein the Group-MBR is a maximum achievable value of a sum of MBRs of QoS flows of the first node group corresponding to a same task.

13. The policy control network element according to claim 12, wherein:

each node in the first node group corresponds to one PDU session, the one PDU session being used to carry at least one QoS flow; and the QoS parameter of the first node group comprises a sum of QOS parameters of QoS flows corresponding to a same task among QoS flows carried by PDU sessions of the first node group.

14. The policy control network element according to claim 12, wherein:

PDU sessions of different nodes in the first node group correspond to a same access network device and a same UPF; or the PDU sessions of different nodes in the first node group correspond to a same access network device and different UPFs; or the PDU sessions of different nodes in the first node group correspond to different access network devices and a same UPF; or the PDU sessions of different nodes in the first node group correspond to different access network devices and different UPFs.

15. The policy control network element according to claim 12, wherein a session management network element of the first node is identical to a session management network element of at least one other node, and a policy control network element of the first node is identical to or different from a policy control network element of the at least one other node, or the session management network element of the first node is different from the session management network element of the at least one other node, and the policy control network element of the first node is identical to the policy control network element of the at least one other node.

16. The policy control network element according to claim 12, wherein said determining the QoS parameter of the service flow of the first node in the first node group based on the QoS parameter of the first node group comprises:

determining, when the QoS parameter of the first node group is constant, a QoS parameter of a service flow of the first node for a session establishment procedure based on a quantity of nodes in the first node group and the QoS parameter of the first node group.

17. The policy control network element according to claim 12, wherein said determining the QoS parameter of the service flow of the first node in the first node group based on the QoS parameter of the first node group comprises:

obtaining first indication information, the first indication information being used to indicate a data processing capacity of a node in the first node group; and determining, when the QoS parameter of the first node group is constant, a QoS parameter of a service flow of the first node for a session modification procedure based on a quantity of the nodes in the first node group, the QoS parameter of the first node group, and the first indication information.

\* \* \* \* \*